(12) United States Patent
Ochiai

(10) Patent No.: US 8,002,597 B2
(45) Date of Patent: Aug. 23, 2011

(54) OUTBOARD MOTOR

(75) Inventor: Katsumi Ochiai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 38 days.

(21) Appl. No.: 12/391,332

(22) Filed: Feb. 24, 2009

(65) Prior Publication Data

US 2009/0215333 A1  Aug. 27, 2009

(30) Foreign Application Priority Data

Feb. 25, 2008  (JP) ................................. 2008-042375

(51) Int. Cl.
*F01N 3/04* (2006.01)
(52) U.S. Cl. .................. 440/89 H; 440/77; 440/89 R
(58) Field of Classification Search .................. 440/77, 440/88 C, 89 F, 89 G, 89 H, 89 J, 89 R; 60/295, 60/297, 298, 299, 302, 310
See application file for complete search history.

(56) References Cited

U.S. PATENT DOCUMENTS

| | | | | |
|---|---|---|---|---|
| 5,174,112 A | * | 12/1992 | Sougawa et al. | 60/302 |
| 5,445,547 A | * | 8/1995 | Furukawa | 440/77 |
| 5,494,467 A | * | 2/1996 | Sohgawa et al. | 440/89 R |
| 5,911,608 A | * | 6/1999 | Nakayama et al. | 440/89 R |
| 6,662,555 B1 | | 12/2003 | Ishii | |
| 7,510,451 B2 | * | 3/2009 | Inaba | 440/77 |
| 7,704,111 B2 | * | 4/2010 | Ito et al. | 440/89 R |

FOREIGN PATENT DOCUMENTS

JP  2000-356123 A  12/2000

OTHER PUBLICATIONS

Ochiai; "Outboard Motor"; U.S. Appl. No. 12/391,329, filed Feb. 24, 2009.

* cited by examiner

*Primary Examiner* — Lars A Olson
(74) *Attorney, Agent, or Firm* — Keating & Bennett, LLP

(57) ABSTRACT

An engine is disposed in a top cowling. Burned gas produced in the engine is discharged to the outside through a first exhaust pipe, a second exhaust pipe, a third exhaust pipe, exhaust passage, and a exhaust passage. A catalyst is disposed to be housed in the first exhaust pipe and the second exhaust pipe. The first exhaust pipe and the second exhaust pipe are disposed in the top cowling. A fan is provided above the catalyst. As a result of this unique structure, a temperature increase in the cowling is prevented from being caused by heat radiated from the catalyst.

10 Claims, 17 Drawing Sheets

OUTBOARD MOTOR

BACKGROUND OF THE INVENTION

1. Field of the Invention

The present invention relates to an outboard motor mounted in a boat.

2. Description of the Related Art

In general, an outboard motor mounted in a boat has a cowling, an upper casing provided below the cowling, and a lower casing disposed below the upper casing.

An engine is disposed in the cowling. An exhaust passage connected to a cylinder of the engine is arranged to extend through the cowling, the upper casing, and the lower casing to a lower portion of the lower casing. The exhaust passage is provided with a catalyst that purifies exhaust gas.

In such a construction, exhaust gas that has flowed out from each cylinder to the exhaust passage is purified in the catalyst, and then discharged into water from a bottom portion of the lower casing.

A lower end portion of the exhaust passage is immersed in water. Therefore, water in a lower end portion of the exhaust passage may flow backward to an engine side as a result of negative pressure or the like that is generated in the engine. Especially, a four-cycle engine is largely affected by exhaust pulsation, so water is sucked to an engine side by strong force, in the exhaust passage.

In order to prevent deterioration of the catalyst, water flowing backward in the exhaust passage must be prevented from adhering to the catalyst. To prevent water adhesion to a catalyst, an outboard motor in which a catalyst is disposed in a cowling has been developed (for example, refer to JP-A-2000-356123).

However, when the catalyst is disposed in the cowling, the temperature in the cowling rises due to heat radiated from the catalyst. Accordingly, electronic components (rectifier regulator, etc.) disposed in the cowling and fuel system components (vapor separator tank, etc.) may suffer from malfunction caused by the increase in heat. Also, heat resistance of the components in the cowling must be improved. Thus, a product cost of outboard motor rises.

SUMMARY OF THE INVENTION

In order to overcome the problems described above, preferred embodiments of the present invention provide an outboard motor that suppresses any temperature increase in the cowling caused by heat radiated from the catalyst.

An outboard motor according to a preferred embodiment of the present invention includes a cowling, an engine disposed in the cowling, a discharge section that is disposed below the cowling and discharges burned gas generated in the engine, an exhaust passage that guides burned gas from the engine to the discharge section, a catalyst that purifies the burned gas in the exhaust passage, and an electric fan that is disposed above the catalyst and discharges air in the cowling to the outside of the cowling.

In this outboard motor, the engine is disposed in the cowling. The discharge section, which discharges burned gas generated in the engine to the outside, is disposed below the cowling. Burned gas discharged from the engine is guided to the discharge section through the exhaust passage. The exhaust passage is provided with the catalyst that purifies exhaust gas.

The catalyst is disposed in the cowling that is arranged above the discharge section. In other words, the catalyst is arranged in an upper portion of the outboard motor. In this case, when water, which entered from the discharge section, flows backward in the exhaust passage, the water can be prevented from reaching the catalyst. Accordingly, water adhesion to the catalyst can be prevented. As a result, lowering of catalyst purification performance can be prevented.

The electric fan, which discharges air in the cowling to the outside of the cowling, is disposed above the catalyst. In this case, heat radiated from the catalyst can be efficiently discharged even when the engine is not driven. In other words, the unique structure and arrangement of this outboard motor prevents a temperature increase in the cowling even if the catalyst is disposed in the cowling.

The catalyst may be disposed on the side of the engine. In this case, upsizing of the cowling in a height direction can be prevented.

The outboard motor may further include a fin that is disposed in an upper portion of the engine and rotated by a crankshaft of the engine.

In this case, the cowling can be ventilated by the fin that is rotated by the crankshaft. Accordingly, a temperature increase in the cowling during the engine operation is sufficiently prevented.

The fan may be operated when the engine stops, for example.

In this case, when the engine is not driven, a temperature increase in the cowling caused by heat radiated from the catalyst can be securely prevented.

The outboard motor may further include a temperature sensor disposed in the engine or the exhaust passage, and a controller that operates the fan when the temperature detected by the temperature sensor reaches a certain degree or higher.

In this case, the fan operates when the temperature of the engine or the exhaust passage reaches a certain degree or higher. Thus, a temperature increase in the cowling can be securely prevented.

The outboard motor may further include a first cover member that covers an upper portion of the engine. The first cover member may preferably include a first opening disposed on an upper surface side, a second opening disposed on a lower surface side, a third opening disposed on an upper surface side, a first communication passage that connects the first opening and the second opening, and a second communication passage that connects the first opening and the third opening. The fan may be disposed in the first communication passage, and the fin may be disposed in the second communication passage.

In this outboard motor, air in the cowling is guided to the first communication passage by the fan. Also, air in the cowling is guided to the second communication passage by the fin. Air in the first communication passage and in the second communication passage is guided to the common first opening.

In other words, the first opening is used as a common ventilation path regardless of whether ventilation is performed by the fan or the fin. In this case, a path used for ventilation is commonly used. Thus, downsizing of the outboard motor is possible.

The second opening may be disposed right above the catalyst. In this case, air around the catalyst can be securely guided to the first communication passage. Accordingly, a temperature increase in the cowling can be prevented more efficiently.

The cowling may have a ceiling surface disposed on an upper side of the first cover member. The ceiling surface may be provided with a fourth opening that communicates with the first opening.

In this case, the fourth opening may be used as a common opening regardless of ventilation performed by the exhaust device or the fin. Accordingly, a plurality of ventilation openings do not have to be disposed in the cowling. Thus, production of cowlings is simplified.

The cowling may have a fifth opening that is disposed in the ceiling surface and connects the inside of the cowling and the outside of the cowling. The first cover member may preferably include an intake passage that introduces air in the cowling to the engine, a sixth opening that connects the intake passage and the inside of the cowling, a divider that is disposed between the fifth opening and the sixth opening.

In this outboard motor, air on the outside of the cowling flows into the cowling through the fifth opening. The air, which has flown into the cowling, is sucked into the engine through the sixth opening and the intake passage.

The divider is disposed between the fifth opening and the sixth opening. In this case, the air, which has flown into the cowling from the fifth opening, can be prevented from suddenly flowing to the sixth opening side. Accordingly, when water flows into the cowling along with air from the fifth opening, the water can be prevented from flowing into the intake passage. As a result, reliability of the engine can be improved.

The outboard motor may further include a second cover member disposed to cover the side of the catalyst.

In this case, the second cover member can prevent the heat generated in the catalyst from radiating to an entire area in the cowling. Also, the second cover member can efficiently guide the heat radiated from the catalyst to the exhaust device. As a result, a temperature increase in the cowling can be securely prevented.

According to a preferred embodiment of the present invention, the electric fan, which discharges air in the cowling to the outside of the cowling, is disposed above the catalyst. In this case, heat radiated from the catalyst can be efficiently discharged even when the engine stops. In other words, according to a preferred embodiment of the present invention, a temperature increase in the cowling can be suppressed even though the catalyst may preferably be disposed in the cowling.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
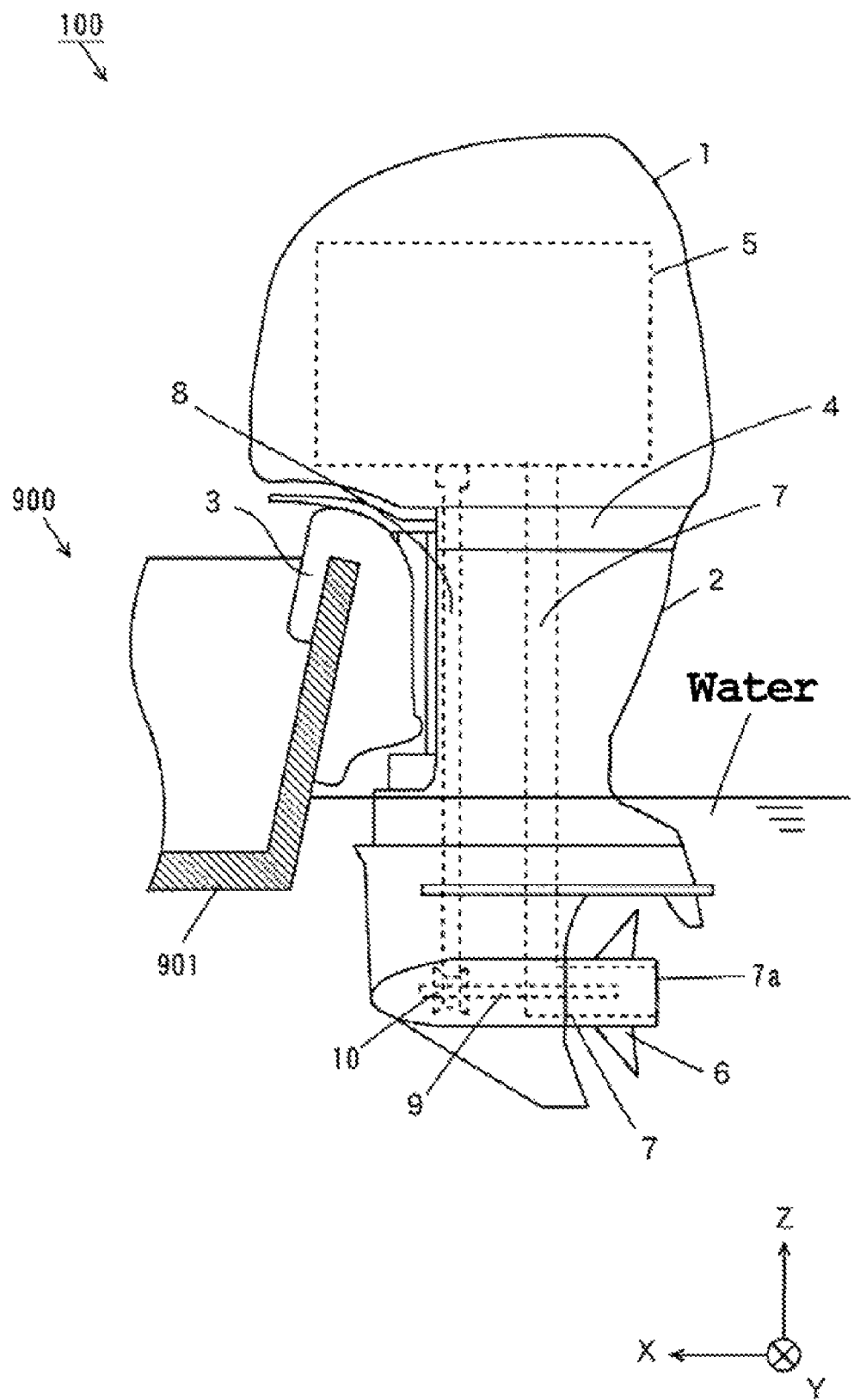
FIG. 1 is a side view showing an outboard motor according to a first preferred embodiment of the present invention.

Hereinafter, an outboard motor according to various preferred embodiments of the present invention is described while referring to drawings.

In the preferred embodiments described below, a downstream end opening 7a is an example of a discharge section; a flow-joining pipe 134, a first exhaust pipe 71, a second exhaust pipe 72, a third exhaust pipe 73, an exhaust passage 70, and an exhaust passage 7 are examples of an exhaust passage; a fan 226 is an example of an exhaust device; an ECU 103 is an example of a controller; a flywheel magneto cover 200 is an example of a first cover member; an opening 224 is an example of a first opening; an opening 223 is an example of a second opening; an opening of a fin cover 210 is an example of a third opening; a space 2234 is an example of a first communication passage; a first ventilation duct 225 is an example of a second communication passage; a ventilation opening 315 is an example of a fourth opening; an intake opening 314 is an example of a fifth opening; an intake duct 105 is an example of an intake passage; an inflow opening 231 is an example of a sixth opening; an elastic member 213 is an example of a divider; and a catalyst cover 137 is an example of a second cover member.

In the above, non-limiting examples of various elements of various preferred embodiments are described. However, the present invention is not limited to these examples or elements. Other various elements that have the same or similar constitution or function as described in the examples above may be used in the present invention.

First Preferred Embodiment (1) General Construction of Outboard Motor

FIG. 1 is a side view showing an outboard motor according to a first preferred embodiment of the present invention.

As shown in FIG. 1, an outboard motor 100 according to a preferred embodiment of the present invention preferably includes, an upper casing 1, a lower casing 2, a clamp bracket 3, and an exhaust guide. The upper casing 1, the lower casing 2, and the clamp bracket 3 are fixed to the exhaust guide 4.

The outboard motor 100 is mounted to a hull 901 of a boat 900 through a clamp bracket 3. In FIG. 1 and FIGS. 2 to 16 described below, as indicated by arrows X, Y, and Z, three directions that are perpendicular to one another are defined as X direction, Y direction, and Z direction. The direction that the X direction arrow points is the front, and its opposite is the rear. The direction that the Z direction arrow points is the top, and its opposite is the bottom. The direction that the respective arrows of X direction, Y direction, and Z direction point is a +side, and its opposite is a −side.

An engine 5 is disposed in the casing 1. The engine 5 is fixed to the exhaust guide 4. A propeller 6 is disposed in a lower portion of the lower casing 2. An exhaust passage 7 is disposed in the lower casing 2. The exhaust passage 7 is arranged to extend from the engine 5 through the exhaust guide 4 and the lower casing 2 to a rear end of the propeller 6. An upper end of the exhaust passage 7 is connected to the exhaust passage 70 (refer to FIG. 2 and FIG. 3) of the engine 5.

A drive shaft 8 is disposed in the lower casing 2 along a vertical direction. The drive shaft 8 is fixed to a crankshaft 142 (refer to FIG. 11) of the engine 5. A propeller shaft 9 is fixed to the inside of the propeller 6. The propeller shaft 9 is connected to a lower portion of the drive shaft 8 through a bevel gear 10.

According to the construction described above, a driving force generated by the engine 5 is transmitted through the drive shaft 8 and the propeller shaft 9 to the propeller 6. Thus, the propeller rotates in a normal direction or a reverse direction. As a result, propulsive force to propel the boat 900 forward or backward is generated. Exhaust gas (burned gas) discharged from the engine 5 is discharged into the water from a downstream end opening 7a of the exhaust passage 7.

Hereinafter, the engine 5 and its surrounding structure are described in detail while referring to drawings.

(2) Arrangement of Peripheral Devices of the Engine

Hereinafter, arrangement of peripheral devices of the engine 5 is described while referring to drawings.

Figure 2:
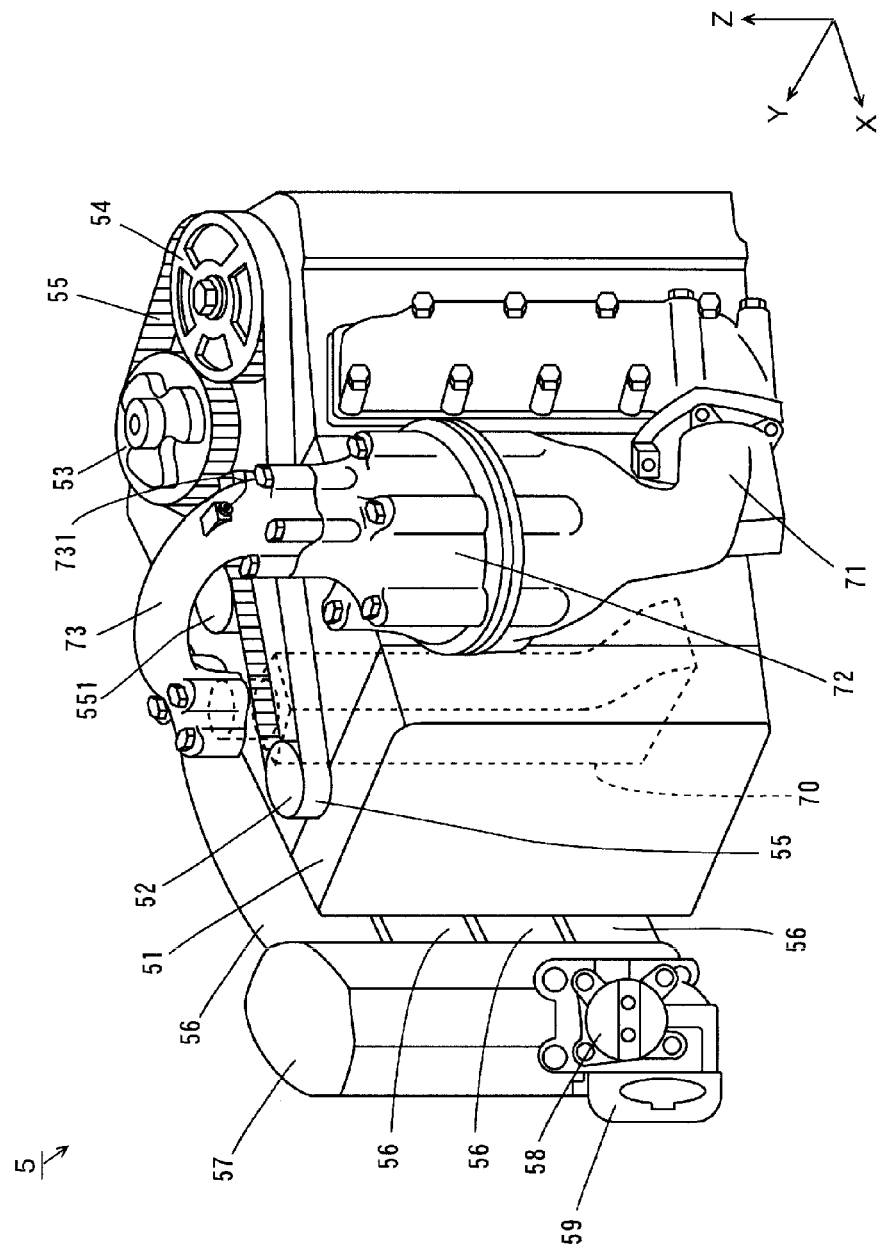
FIG. 2 is a schematic perspective view of the engine.
Figure 3:
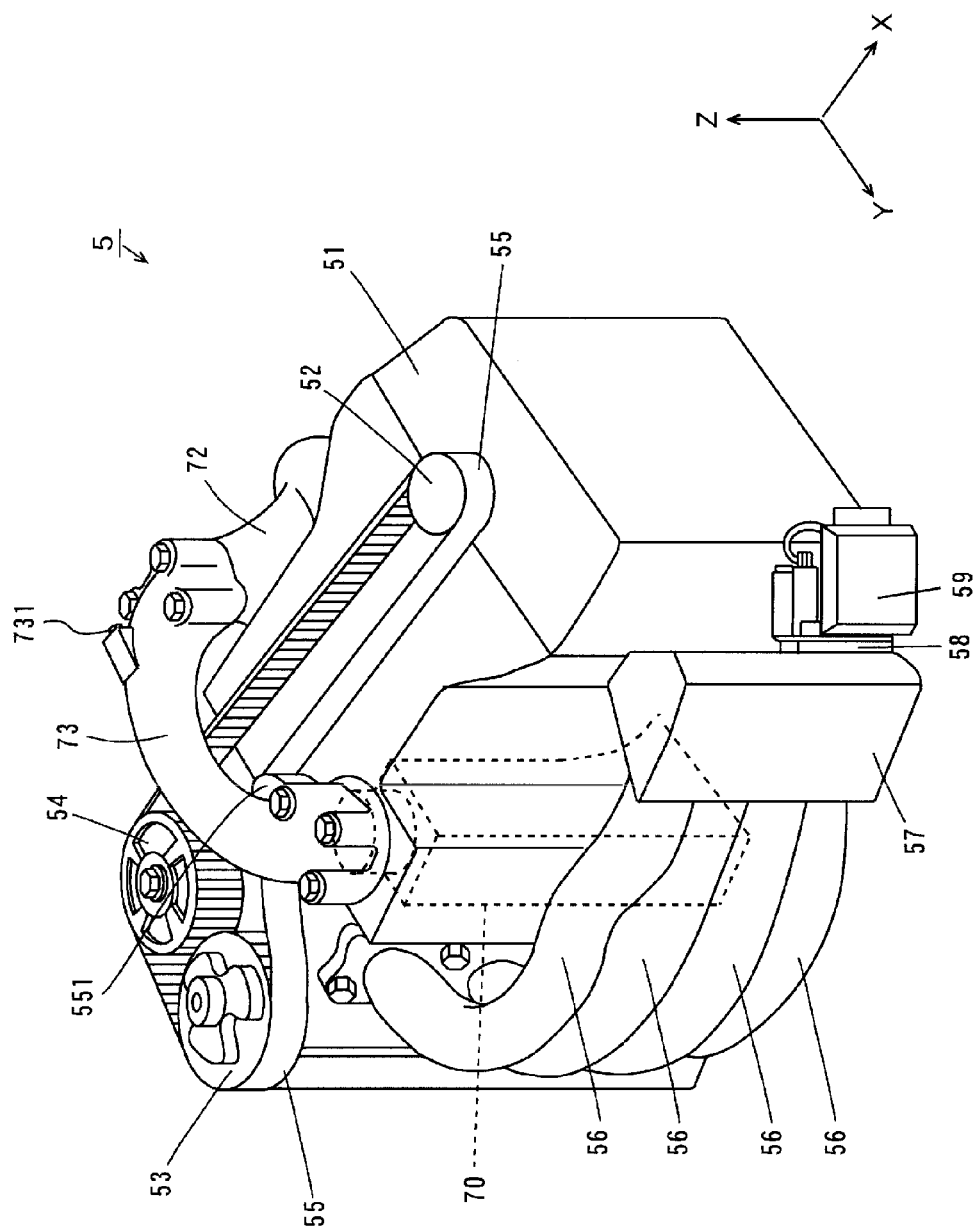
FIG. 3 is a schematic perspective view of the engine.

FIG. 2 and FIG. 3 are schematic perspective views showing the engine 5.

As shown in FIG. 2 and FIG. 3, the engine 5 has an engine body 51. In FIG. 2, the engine body 51 is shown in a simplified manner for easier description.

A drive pulley 52 is disposed above a front portion of the engine body 51. The drive pulley 52 is fixed to the crankshaft 142 (refer to FIG. 11). Driven pulleys 53, 54 are disposed above a rear portion of the engine body 51. The driven pulleys 53, 54 are fixed to a camshaft (not shown) of the engine 5. A timing belt 55 is placed on the drive pulley 52 and the driven pulleys 53, 54. In the present preferred embodiment, a belt-tensioning device 551 is disposed above a center portion of the engine body 51. The belt-tensioning device 551 maintains the tension of the timing belt 55.

The exhaust passage 70 is located on a +Y side of the engine body 51. One end of the first exhaust pipe 71 (FIG. 2) generally in the shape of L is connected to a side surface of the engine body 51 on a -Y side. One end of the second exhaust pipe 72 in the shape of a cylinder is connected to the other end of the first exhaust pipe 71. A catalyst 11 is housed in the first exhaust pipe 71 and the second exhaust pipe 72 (refer to FIG. 5 and FIG. 9).

One end of the third exhaust pipe 73 in the shape of inverted U is connected to the other end of the second exhaust pipe 72. The other end of the third exhaust pipe 73 is connected to one end of the exhaust passage 70. The third exhaust pipe 73 is preferably arranged to pass above the timing belt 55. The extension pipe 731 is disposed in the third exhaust pipe 73. The extension pipe 731 is described later.

In this way, the first and second exhaust pipes 71, 72 are disposed on one side of the engine body 51, and the exhaust passage 70 is disposed on the other side. The third exhaust pipe 73 is arranged to pass above the engine body to connect the second exhaust pipe 72 and the exhaust passage 70. Accordingly, when water flows backward in the exhaust passage 7 in FIG. 1, the water can be prevented from passing in the third exhaust pipe 73 toward an upstream side.

As described above, the catalyst 11 (refer to FIG. 5) preferably is housed in the first exhaust pipe 71 and the second exhaust pipe 72. In other words, in the present preferred embodiment, the catalyst 11 is disposed upstream relative to the third exhaust pipe 73. Accordingly, when water flows backward in the exhaust passage 7 in FIG. 1, the catalyst 11 can be sufficiently protected from water adhesion.

First ends of a plurality of in take pipes 56 (preferably 4 pipes in the present preferred embodiment, for example) are connected to a side surface of the engine body 51 on a -Y side. Second ends of the plurality of intake pipes 56 are connected to a surge tank 57 disposed on a +Y side of the engine body 51. A throttle body 58 and a throttle drive motor 59 are disposed below the surge tank 57.

Figure 4:
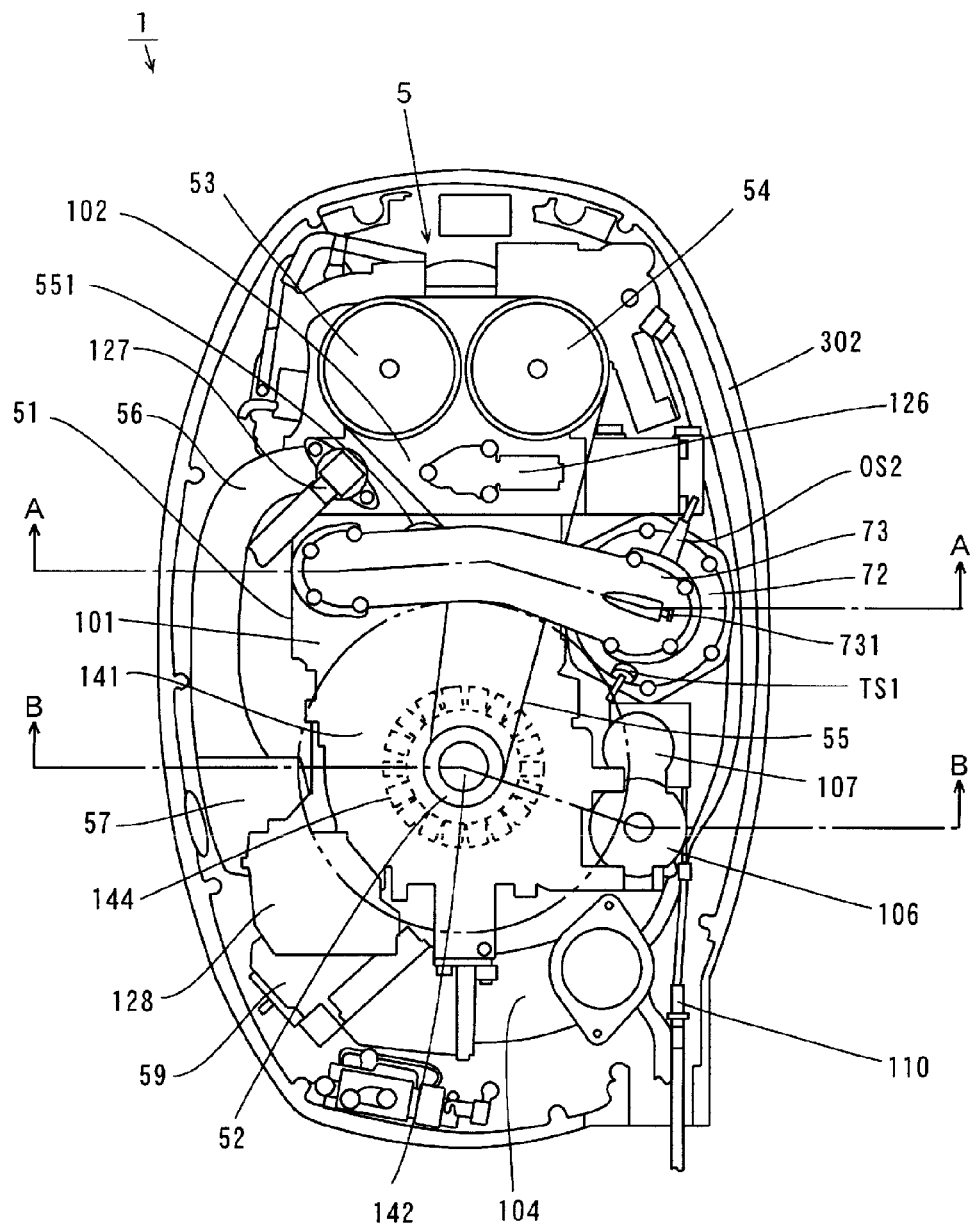
FIG. 4 is a top view showing a construction of the engine.
Figure 4:
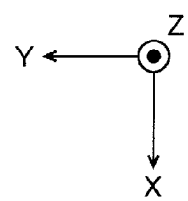
Figure 5:
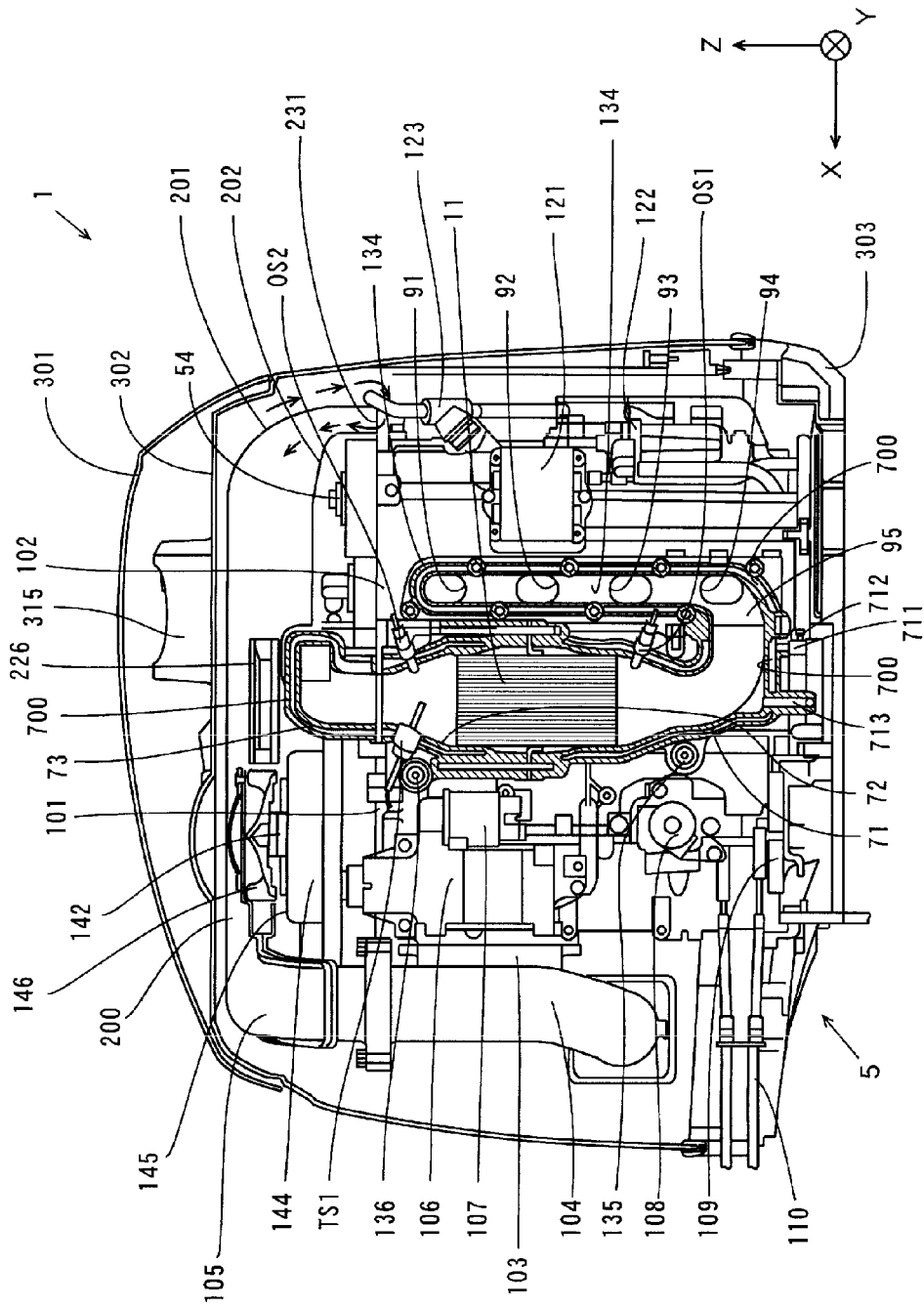
FIG. 5 is a partial cross-section of the inside of the upper casing as seen from a −Y side.
Figure 6:
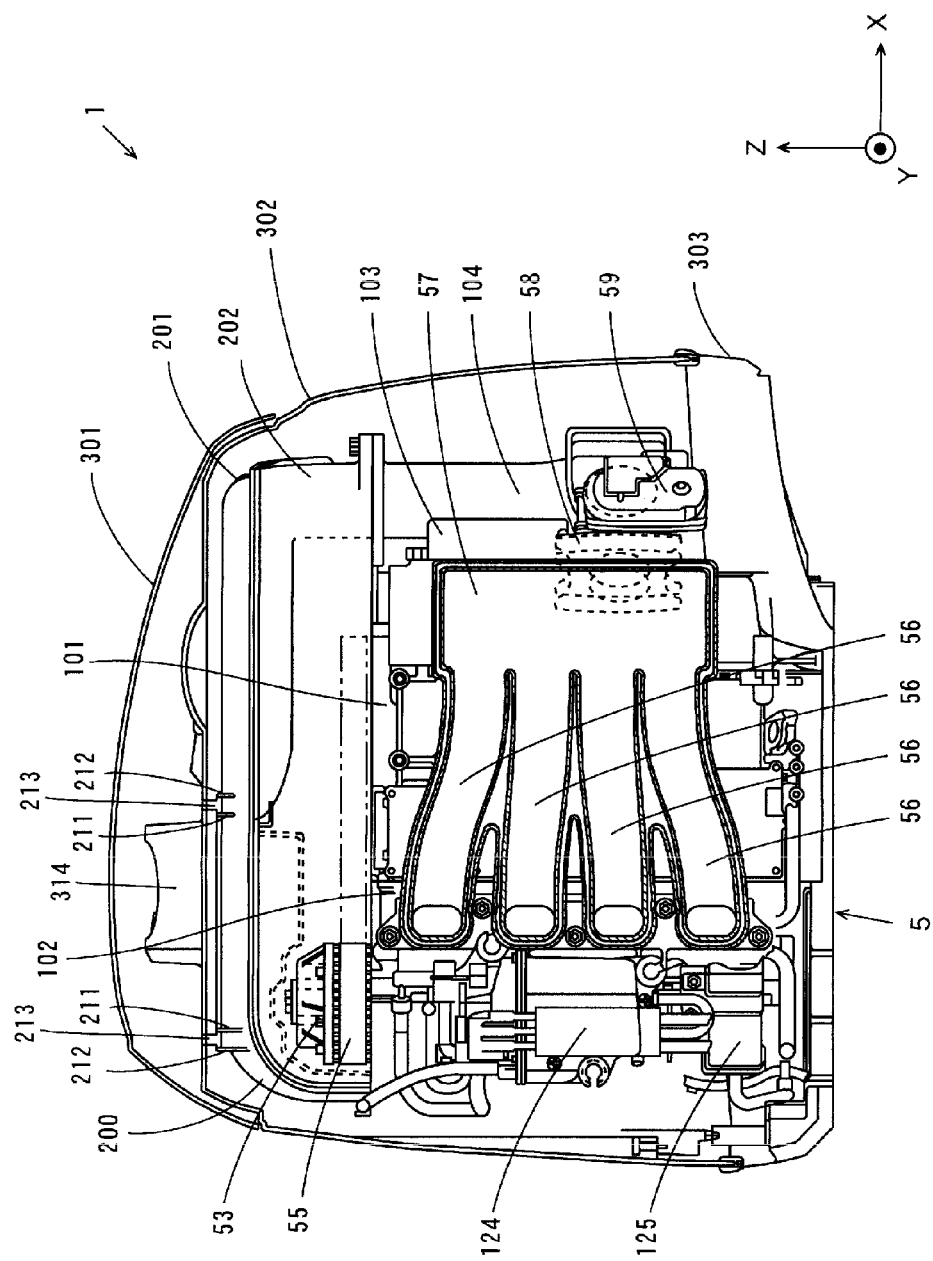
FIG. 6 is a partial cross-section of the inside of the upper casing as seen from a +Y side.
Figure 7:
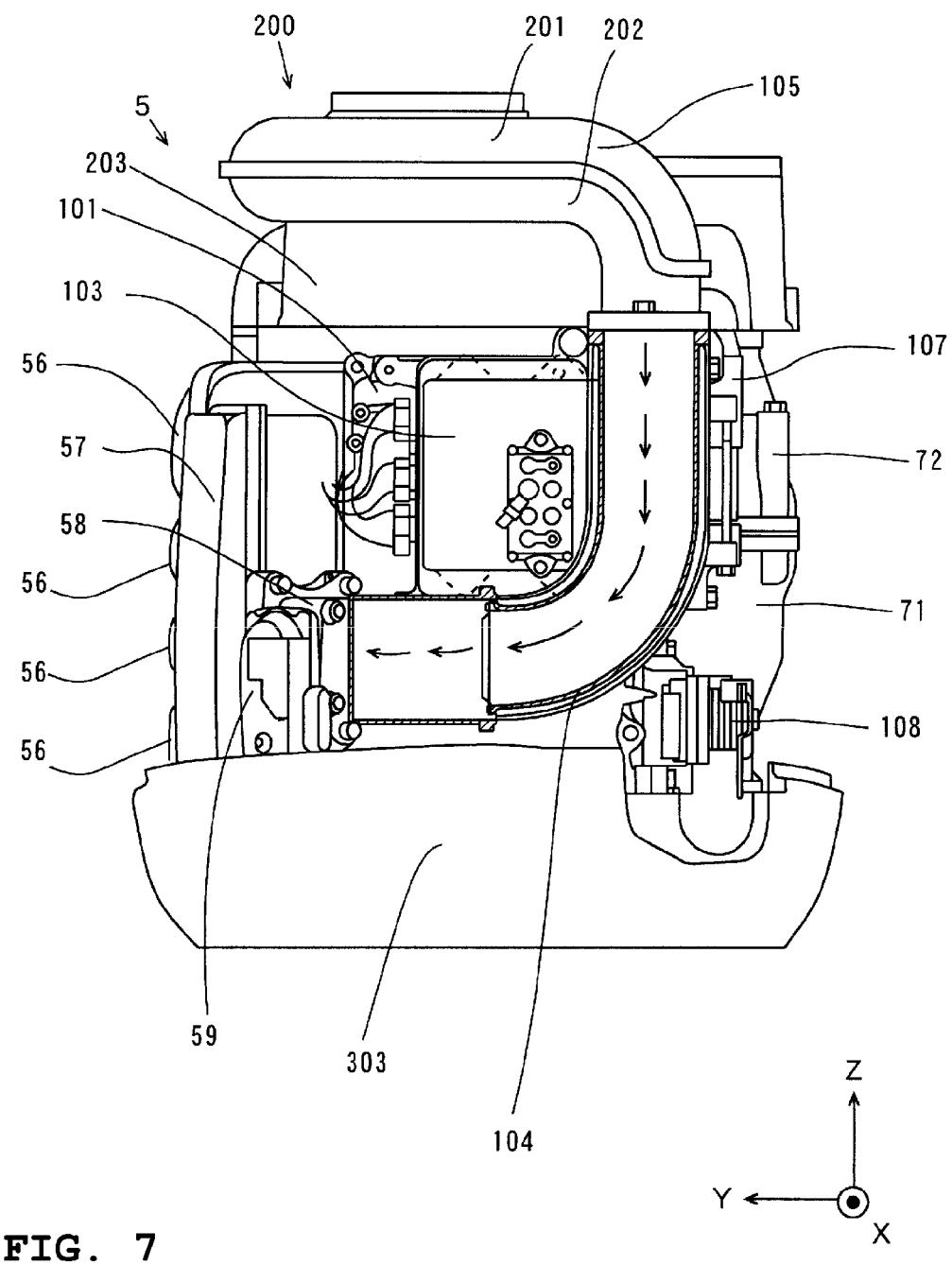
FIG. 7 is a front view of an engine.

FIG. 4 is a top view showing a construction of the engine 5. FIG. 5 is a partial cross-section of the upper casing 1 as seen from a -Y side. FIG. 6 is a partial cross-section of the upper casing 1 as seen from a +Y side. FIG. 7 is a front view of the engine 5.

As shown in FIG. 4 to FIG. 6, the engine body 51 includes a cylinder block 101 and a cylinder head 102. As shown in FIG. 5 to FIG. 7, the ECU (Engine Control Unit) 103 is disposed in front of the cylinder block 101.

As shown in FIG. 6 and FIG. 7, one end of a communication pipe 104 generally in the shape of L is connected to the throttle body 58 at the front of the cylinder block 101. The other end of the communication pipe 104 is connected to an intake duct 105 of a flywheel magneto cover 200. The flywheel magneto cover 200 and the intake duct are described in detail in later paragraph. In FIG. 7, a cross-section of the communication pipe 104 is shown.

As shown in FIG. 5, a starter motor 106 and a starter relay are disposed in an upper portion of a side surface of the cylinder block 101 on a -Y side. An accelerator-opening sensor 108 and a shift slider 109 are disposed below the starter relay 107. The shift slider is connected to a shift lever (not shown) through a connection mechanism 110 formed with a shift rod or the like. A rectifier regulator unit 121 is disposed in a side surface of the cylinder head on a -Y side.

As shown in FIG. 5 and FIG. 6, a fuel filter 122 (FIG. 5), a high-pressure filter 123 (FIG. 5), a vapor separator tank 124 (FIG. 6), and a canister 125 (FIG. 6) are disposed behind the cylinder head 102.

As shown in FIG. 4, a valve timing mechanism (not shown) and an oil control valve 126 to adjust an amount of oil supplied to the valve timing mechanism are disposed in the cylinder head 102. A thermostat 127, which controls a temperature of cooling water in the engine 5, is disposed in an upper surface of the cylinder head 102 on a -X side. An electrical component box 128, in which various electrical devices are housed, is disposed above the throttle drive motor 59.

(3) Construction of Engine

Now, construction of the engine 5 is described in detail while referring to drawings.

Figure 8:
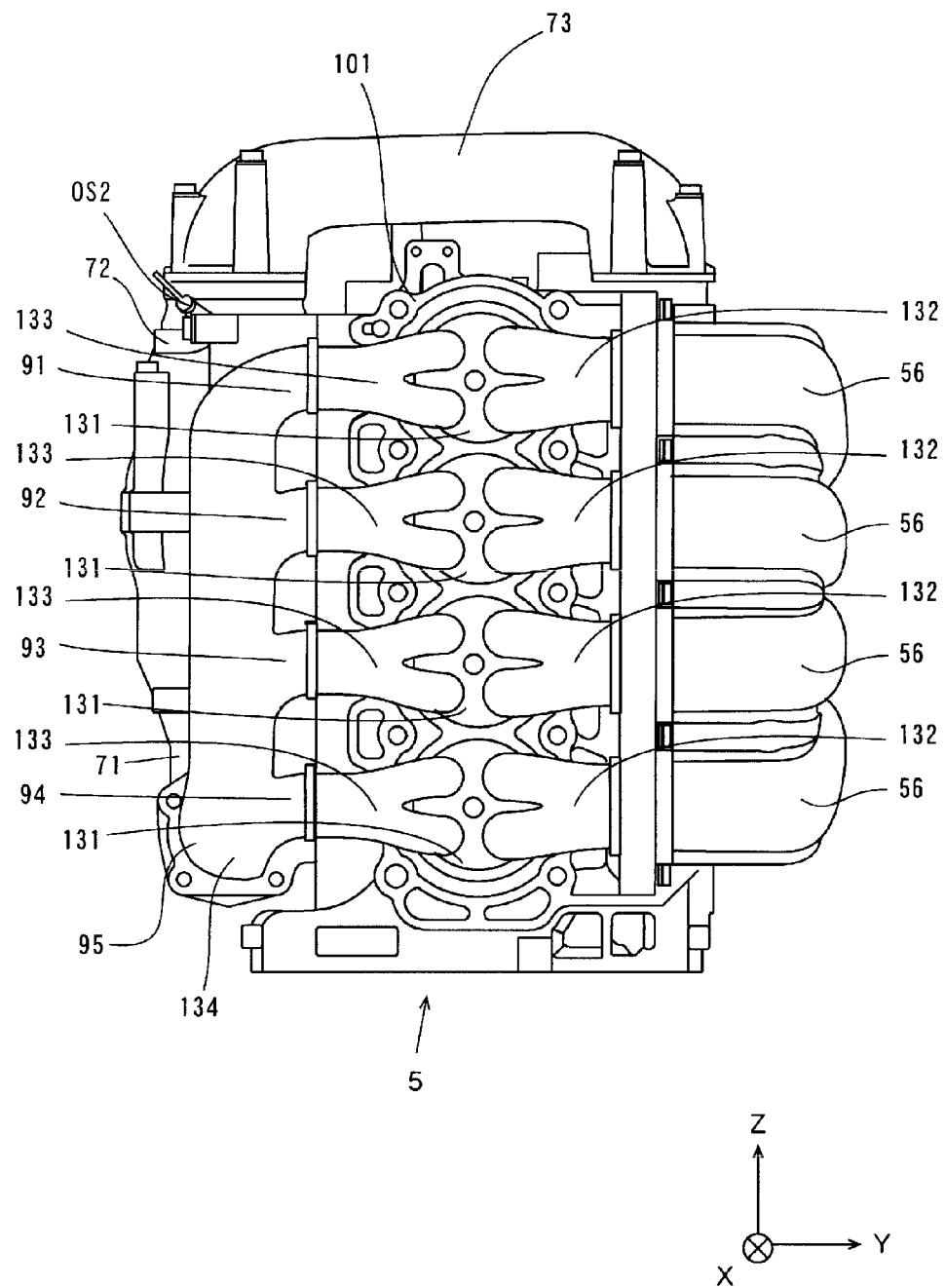
FIG. 8 is a rear view of a cylinder block.
Figure 9:
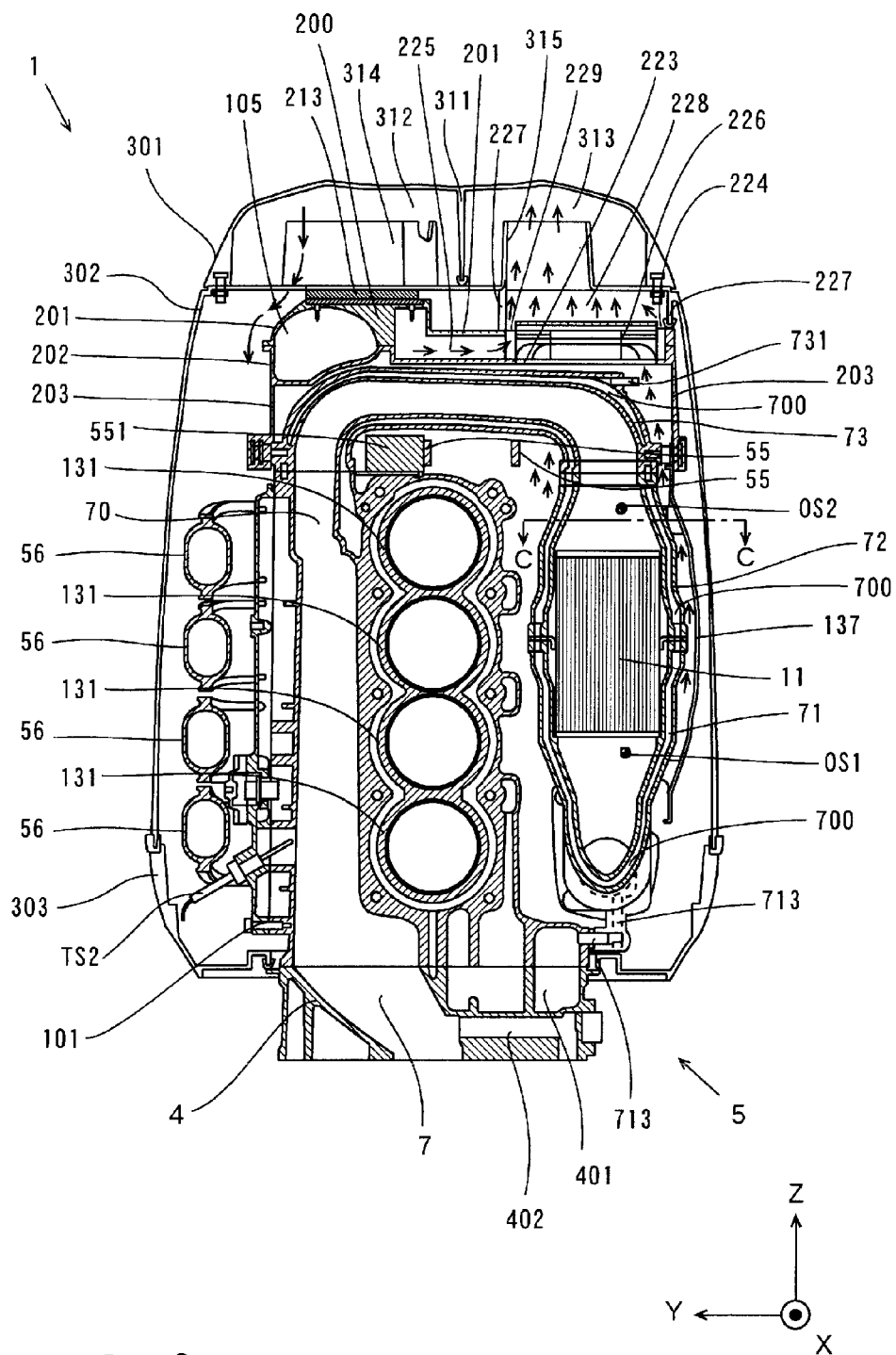
FIG. 9 is a sectional view taken along the line A-A of FIG. 4.
Figure 10:
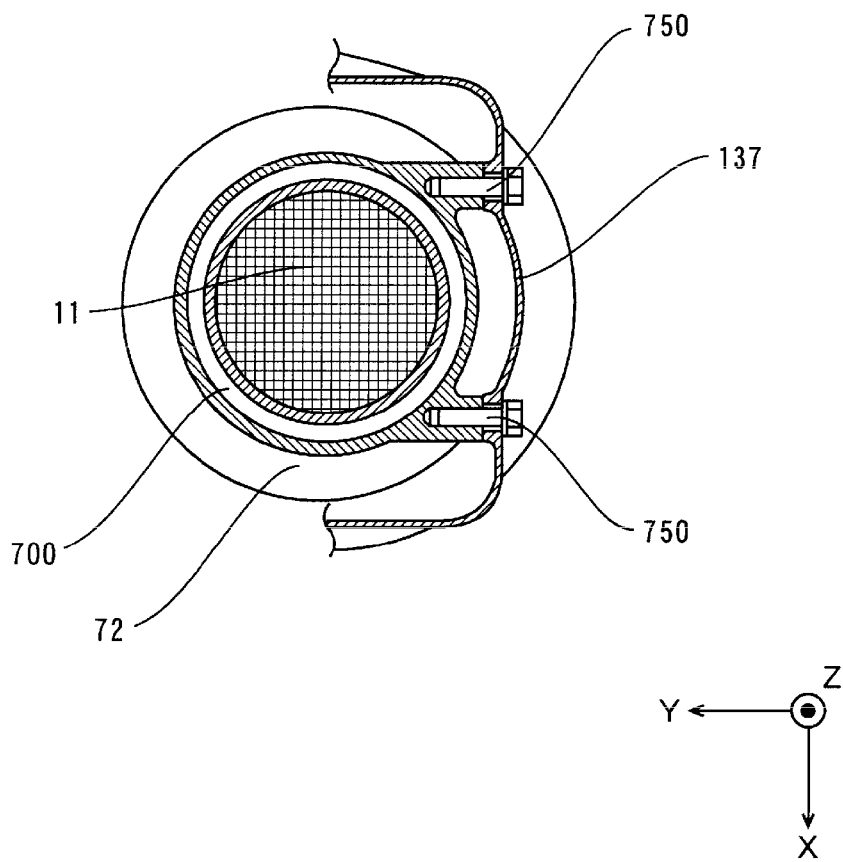
FIG. 10 is a sectional view taken along the line C-C of FIG. 9.
Figure 11:
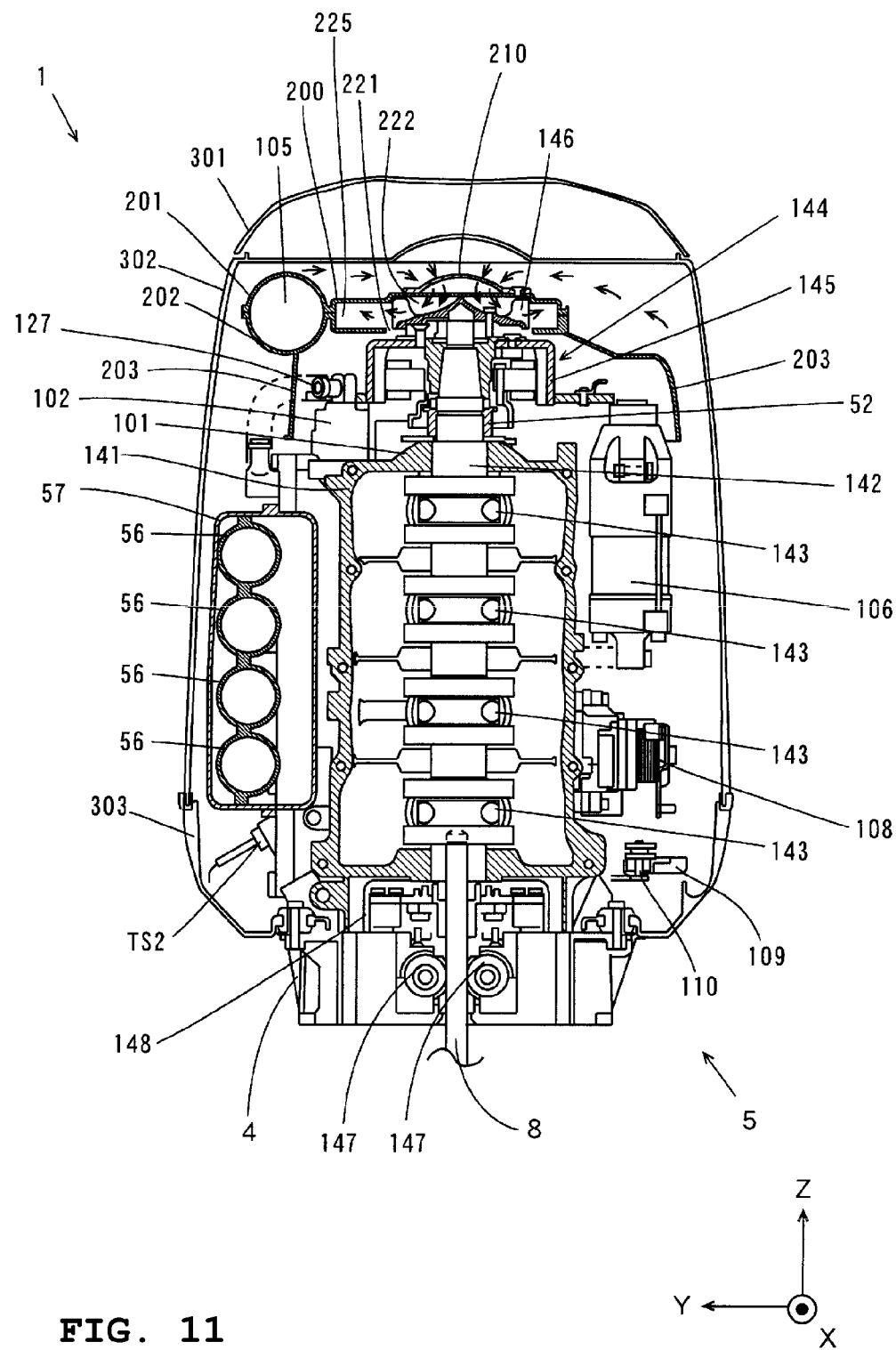
FIG. 11 is a sectional view taken along the line B-B of FIG. 4.

FIG. 8 is a rear view of the cylinder block 101. FIG. 9 is a cross-sectional view, taken along the line A-A in FIG. 4. FIG. 10 is a cross-sectional view taken along the line C-C in FIG. 9. FIG. 11 is a cross-sectional view taken along the line B-B in FIG. 4.

As shown in FIG. 8 and FIG. 9, four cylinders 131 are preferably disposed to be lined vertically in a rear portion of the cylinder block 101. As shown in FIG. 8, the intake port 132 and the exhaust port 133 are disposed in each cylinder 131. The intake port 132 and the exhaust port 133 are formed in the cylinder head 102 (refer to FIG. 4 to FIG. 6).

The intake pipe 56 is connected to each intake port 132. The flow-joining pipe 134 is connected to the four exhaust ports 133. As shown in FIG. 5 and FIG. 8, the flow-joining pipe 134 preferably has four branch portions 91 to 94 disposed to extend in a +Y direction and a flow-joining portion 95 disposed to extend in a +X direction.

The branch portions 91 to 94 are disposed to be lined in a vertical direction. The flow-joining portion 95 is disposed generally at the same height as the branch portion 94, which is the bottommost of branch portions 91 to 94. The branch portions 91 to 94 are connected to the exhaust port 133, and the flow-joining portion 95 is connected to the first exhaust pipe 71.

As shown in FIG. 5 and FIG. 9, the catalyst 11 is disposed in a connection portion of the first exhaust pipe 71 and the second exhaust pipe 72. The catalyst 11 is fixed in the first and second exhaust pipes 71, 72. As the catalyst 11, a three-way catalyst is used, for example.

As shown in FIG. 5, in the present preferred embodiment, the first exhaust pipe 71 is attached to the cylinder block 101 through an elastic member 135. Similarly, the second exhaust pipe 72 is attached to the cylinder block 101 through an elastic member 136. Accordingly, vibration transmitted from the cylinder block 101 to the catalyst 11 can be damped. As a result, the reliability of the catalyst 11 can be improved. As the elastic members 135, 136, elastic rubber can be used, for example.

As shown in FIG. 9 and FIG. 10, a catalyst cover 137 is attached to cover a side surface of the first exhaust pipe 71 and the second exhaust pipe 72 on a −Y side. As shown in FIG. 10, the catalyst cover 137 is fixed to the second exhaust pipe 72 (and the third exhaust pipe 73) preferably by bolts 750, for example. The catalyst cover 137 is disposed to cover at least a −Y side of the catalyst from its center. Accordingly, when the engine 5 is under maintenance or the like, a user can be prevented from touching the first and second exhaust pipes 71, 72 that are heated by radiant heat of the catalyst 11. Other effects of the catalyst cover 137 are described later.

As shown in FIG. 5, FIG. 9 and FIG. 10, the flow-joining pipe 134, the first exhaust pipe 71, the second exhaust pipe 72, and the third exhaust pipe 73, has the flow path 700. The flow paths 700 of the flow-joining pipe 134, the first exhaust pipe 71, the second exhaust pipe 72, and the third exhaust pipe 73 are communicated one another. When the engine 5 is operated, cooling water is supplied in the flow path 700. Accordingly, a temperature increase in the flow-joining pipe 134, the first exhaust pipe 71, the second exhaust pipe 72, and the third exhaust pipe 73 is prevented.

As shown in FIG. 5, a cooling water supply portion 711 is located in a lower end portion of the first exhaust pipe 71. An extension pipe 712 is disposed in the cooling water supply portion 711. In the present preferred embodiment, cooling water is supplied from a cooling water supply source (not shown) through the extension pipe 712 and the cooling water supply portion 711 to the flow path 700 of the first exhaust pipe 71.

When the engine 5 is not operated, cooling water in the flow path 700 is discharged through the cooling water supply portion 711 and the extension pipe 712. In the present preferred embodiment, the cooling water supply portion 711 is preferably disposed in a lower end portion of the first exhaust pipe 71. Accordingly, cooling water in the flow path 700 can be discharged efficiently and securely. As a result, cooling water is sufficiently prevented from remaining in the flow path 700.

As shown in FIG. 9, the extension pipe 731 is disposed in an upper surface of the third exhaust pipe 73 so as to communicate the flow path 700 and an outside portion of the third exhaust pipe 73. The extension pipe 731 is communicated to the outside of the upper casing 1 by a hose (not shown). Accordingly, air in the flow path 700 is discharged to the outside of the upper casing 1. As a result, cooling water can be efficiently circulated in the flow path 700.

As shown in FIG. 5 and FIG. 9, a first oxygen sensor OS1 is disposed in the first exhaust pipe 71. The first oxygen sensor OS1 is disposed in an upstream side of the catalyst 11. A second oxygen sensor OS2 and a first temperature sensor TS1 (FIG. 5) are disposed in the second exhaust pipe 72. The second oxygen sensor OS2 and the first temperature sensor TS1 are disposed at a downstream side of the catalyst 11.

As the first and second oxygen sensor OS1, OS2, a sensor using a ceramic component can be used, for example. An oxygen sensor including zirconia ceramics can be used, for example.

The first oxygen sensor OS1 detects an oxygen concentration in the first exhaust pipe 71. The second oxygen sensor OS2 detects an oxygen concentration in the second exhaust pipe 72. The first temperature sensor TS1 detects temperature in the second exhaust pipe 72. Detected values of the first oxygen sensor OS1, the second oxygen sensor OS2, and the first temperature sensor TS1 are supplied to the ECU 103 in FIG. 7.

The ECU 103 adjusts an air-fuel ratio of mixture in the cylinder 131 (FIG. 9) by controlling a fuel injection device (not shown) or a valve timing mechanism (not shown) based on a detected value of the first oxygen sensor OS1.

The ECU 103 determines whether or not exhaust gas is properly purified in the catalyst 11, based on a detected value of the second oxygen sensor OS2.

The ECU 103 drives a fan 226 (FIG. 9) based on a detected value of the first temperature sensor TS1.

The first oxygen sensor OS1 is preferably disposed above a bottom cowling 303 (FIG. 5). Accordingly, when water flows in the bottom cowling 303, water adhesion on the first oxygen sensor OS1 can be securely prevented. As a result, the reliability of the first oxygen sensor OS1 can be surely improved.

As shown in FIG. 9, the exhaust passage 70 is located in a side portion of the cylinder block 101 on a +Y side. The exhaust passage 70 is arranged to extend vertically on the side of the cylinder 131. An upper end of the exhaust passage 70 is connected to the third exhaust pipe 73. A lower end of the exhaust passage 70 is connected to the exhaust passage 7 formed in the exhaust guide 4.

The second temperature sensor TS2 is disposed in a lower end portion of the exhaust passage 70. The second temperature sensor TS2 detects temperature in the exhaust passage 70. A detected value of the second temperature sensor TS2 is supplied to the ECU 103. The ECU 103 determines whether or not water is intruded into the exhaust passage 70, based on a detected value of the second temperature sensor TS2.

As shown in FIG. 5 and FIG. 9, a communication passage 713, which communicates the first exhaust pipe 71 and spaces 401, 402 in the exhaust guide 4, is disposed in a lower end portion of the first exhaust pipe 71. In this case, when condensation occurs in the first exhaust pipe 71 when the engine 5 is not operating, water can be discharged from the communication passage 713 to the outside of the first exhaust pipe 71. Accordingly, water adhesion on the first oxygen sensor OS1 can be prevented. As a result, the reliability of the first oxygen sensor OS1 can be improved. The space 402 is used for an exhaust passage when the engine 5 idles.

As shown in FIG. 11, a crankcase 141 is disposed in front of the cylinder block 101. The crankshaft 142 is disposed to extend vertically in the crankcase 141. One end of a connecting rod 143, which is disposed in each cylinder 131 (FIG. 9), is connected to the crankshaft 142. The other end of connecting rod 143 is connected to a piston (not shown) disposed in each cylinder 131.

An upper end portion of the drive shaft 8 is connected to a lower end portion of the crankshaft 142. Accordingly, torque of the crankshaft 142 is transmitted to the drive shaft 8.

As shown in FIG. 5 and FIG. 11, the flywheel magneto 144 is disposed above the crankcase 141. A rotor (flywheel) 145 of the flywheel magneto 144 is fixed to the crankshaft 142. The rotor 145 is rotated with the rotation of the crankshaft 142. Accordingly, electric power is generated in the flywheel magneto 144.

A fin 146 is attached in an upper end portion of the crankshaft 142. The fin 146 is rotated with the rotation of the crankshaft 142. Accordingly, heat in the upper casing 1 is discharged to the outside. A heat discharge pathway in the upper casing 1 is described later.

The flywheel magneto cover 200 is disposed above the crankcase 141 so as to cover the flywheel magneto 144 and the fin 146. The flywheel magneto cover 200 is described in detail in later paragraph.

As shown in FIG. 11, the cylinder block 101 is fixed on the exhaust guide 4. An upper mount 147 is disposed between the cylinder block 101 and the exhaust guide 4. Accordingly, the cylinder block 101 can be stabilized on the exhaust guide 4. An oil pump 148, which supplies oil to the engine 5, is disposed between the cylinder block 101 and the exhaust guide 4.

As shown in FIG. 5, FIG. 6, FIG. 9 and FIG. 11, the upper casing 1 has a top cover 301, a top cowling 302, and a bottom cowling 303. The bottom cowling 303 is fixed to the exhaust guide 4 so as to cover an outer periphery of a lower portion of the engine 5. The top cowling 302 is fixed to the bottom cowling 303 so as to cover the side and top of the engine 5. The top cover 301 is attached to an upper surface of the top cowling 302.

As shown in FIG. 9, a partition wall 311 is disposed in a center portion of the top cover 301 in Y direction. The partition wall 311 forms a space 312 and a space 313 between the top cover 301 and the top cowling 302.

In the space 312, an inlet opening 314 is disposed in an upper surface of the top cowling 302. In the space 313, a ventilation opening 315 is disposed in an upper surface of the top cowling 302.

In the present preferred embodiment, air in the outside of the upper casing 1 is supplied through the space 312, the inlet opening 314, and the flywheel magneto cover 200 to the communication pipe 104 (FIG. 7). Air in the top cowling 302 is discharged through the flywheel magneto cover 200, ventilation opening 315, and the space 313 to the outside of the upper casing 1.

Figure 12:
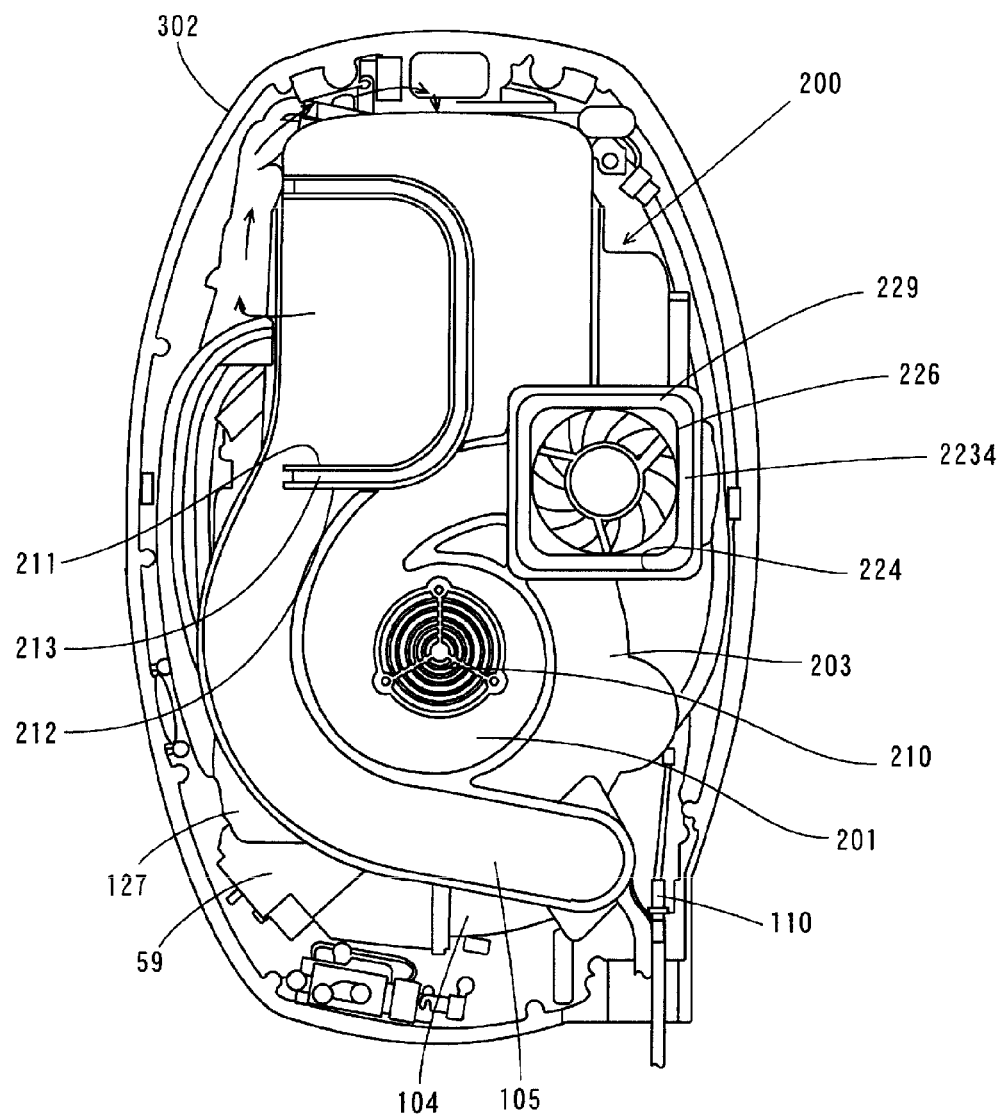
FIG. 12 is a top view of a flywheel magneto cover.
Figure 13:
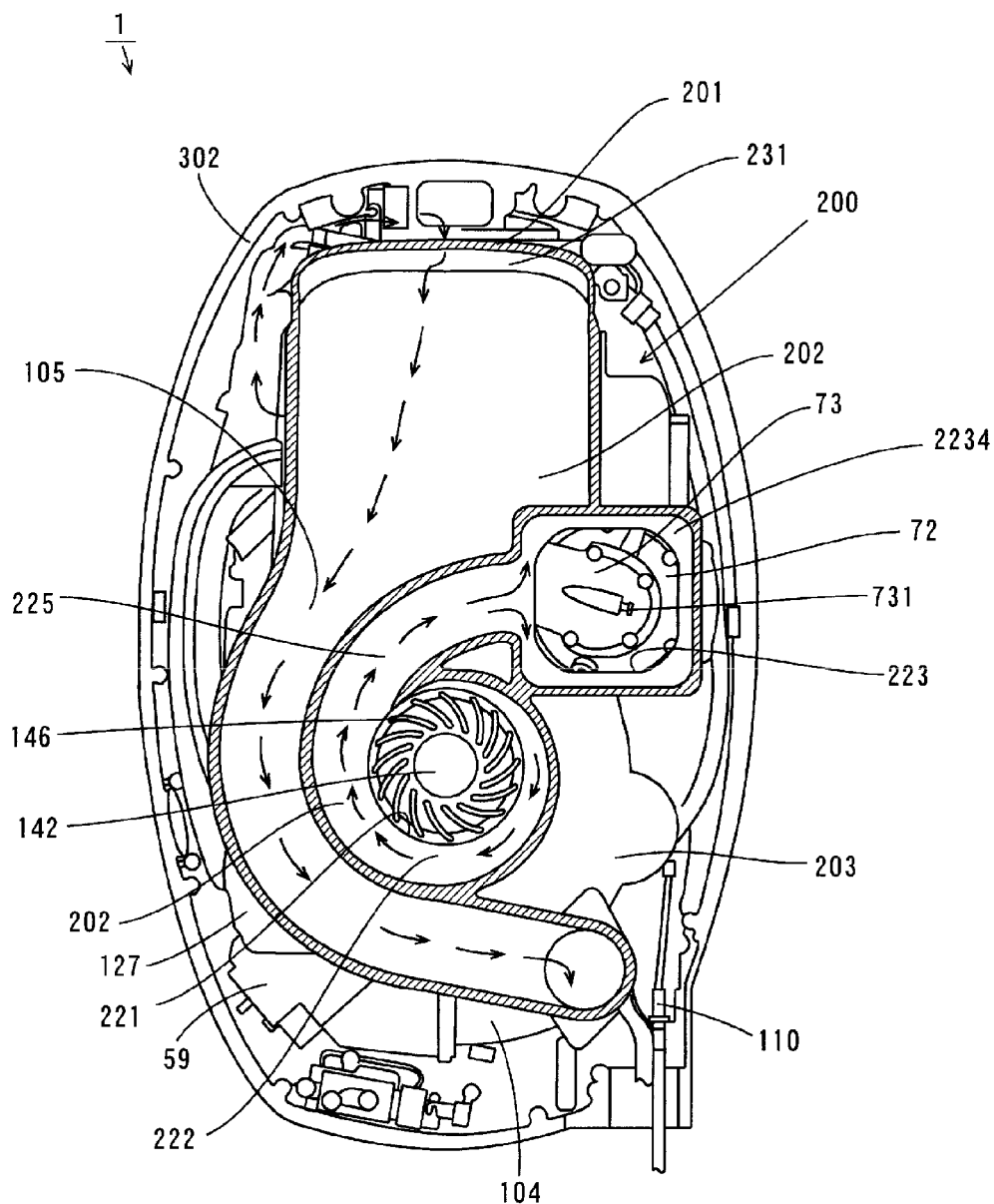
FIG. 13 is a partial cross-section showing an inner structure of a flywheel magneto cover.

(4) Flywheel Magneto Cover (4-1) Construction of Flywheel Magneto Cover
Construction of the flywheel magneto cover 200 is described in detail while referring to drawings.
FIG. 12 is a top view of the flywheel magneto cover 200. FIG. 13 is a partial cross-sectional view showing an inner structure of the flywheel magneto cover 200.

As shown in FIG. 5 to FIG. 7, FIG. 9, and FIG. 11 to FIG. 13, the flywheel magneto cover 200 has an upper cover 201 and a lower cover 202. In FIG. 13, a cross-section of the upper cover 201 is shown by hatch pattern.

As shown in FIG. 12, convex portions 211, 212, which are generally in the shape of U in a XY plane, are disposed on a −X side of the upper cover 201. The convex portions 211, 212 are formed in a way that the both ends thereof face a +Y side. An elastic member 213 is fitted between the convex portion 211 and the convex portion 212.

As shown in FIG. 9, the elastic member 213 is in tight contact with a ceiling surface of top cowling 302. In the present preferred embodiment, a forming position of the inlet opening 314 and the convex portions 211, 212 is set in a way that the inlet opening 314 is located inside the elastic member 213 in a XZ plane.

As shown in FIG. 7, FIG. 9, and FIG. 11 to FIG. 13, an outer wall 203 is formed to extend in a −Z direction on a lower surface side of the lower cover 202. As shown in FIG. 9, a lower end portion of the outer wall 203 is fixed to the third exhaust pipe 73. Accordingly, the flywheel magneto cover 200 is fixed to the engine 5. The driven pulleys 53, 54 (FIG. 2 to FIG. 4), the third exhaust pipe 73, and the top and side of the flywheel magneto 144 (FIG. 11) are covered by the lower cover 202 and the outer wall 203.

As shown in FIG. 11 and FIG. 13, in the lower cover 202, an opening 221 is formed on an axial extension of the crankshaft 142. A space 222 generally in the shape of a cylinder is formed on the opening 221 of the flywheel magneto cover 200. The crankshaft 142 is inserted in the opening 221. In the space 222, the fin 146 is attached to the crankshaft 142. As shown in FIG. 11 and FIG. 12, on top of the fin 146 in the upper cover 201, a fin cover 210 in the shape of a net having a plurality of openings is disposed.

As shown in FIG. 9 and FIG. 13, in the lower cover 202, an opening 223 is formed in an upper portion of the second exhaust pipe 72. In the upper cover 201, an opening 224 (FIG. 12), which has larger area than the opening 223, is formed in an upper portion of the opening 223. As shown in FIG. 12 and FIG. 13, a space 2234 is formed between the opening 223 (FIG. 13) and the opening 224 (FIG. 12).

As shown in FIG. 9 and FIG. 13, a first ventilation duct 225 is formed to extend from the space 222 (FIG. 13) to the space 2234 (FIG. 13). As shown in FIG. 9, the electric fan 226 is disposed above the opening 223.

As shown in FIG. 9, a divider 227 is disposed between the top cowling 302 and the flywheel magneto cover 200, so as to form a space that connects the opening 224 and the ventilation opening 315 (this space is referred to as second ventilation duct 228).

As shown in FIG. 9 and FIG. 12, dimensions of the opening 224 and the fan 226 are set so as to form a gap 229 between an inner periphery surface of the opening 224 and an outer periphery surface of the fan 226. The first ventilation duct 225 and the second ventilation duct 228 are communicated by the gap 229.

As shown in FIG. 9 and FIG. 13, the intake duct 105 is arranged so as to cover a portion of an outer periphery of the first ventilation duct 225. As shown in FIG. 7, an end portion of the intake duct 105 on a +X side is connected to the communication pipe 104.

As shown in FIG. 5 and FIG. 13, an inflow opening 231 is formed between an end portion of the upper cover 201 on a −X side and an end portion of the lower cover 202 on a −X side. The inflow opening 231 communicates the intake duct 105 with the outside of the flywheel magneto cover 200.

(4-2) Intake Passage

Hereinafter, an intake passage from the inlet opening 314 to the engine 5 is described.

As described above, in the present preferred embodiment, the elastic member 213 (FIG. 9) and the ceiling surface of the top cowling 302 (FIG. 9) are in tight contact. In this case, airflow from the inlet opening 314 (FIG. 9) to a ±X side and a −Y side is prevented by the elastic member 213. Thus, as indicated by arrow in FIG. 9 and FIG. 12, air introduced into the intake opening 314 flows to a +Y side of the flywheel magneto cover 200.

As indicated by arrow in FIG. 12, the air, which has flown to a +Y side of the flywheel magneto cover 200, flows to a −X side of the flywheel magneto cover 200. As indicated by arrow in FIG. 5 and FIG. 13, the air flows from the inflow opening 231 into the intake duct 105. Thereafter, as indicated by arrow in FIG. 7, the air is supplied from the intake duct 105 through the communication pipe 104 and the surge tank 57 to the intake pipe 56.

(4-3) Ventilation Passage

A ventilation passage in the top cowling 302 (FIG. 11) is described.

The fin 146 (FIG. 11) rotates when the engine 5 operates. In this case, as indicated by arrow in FIG. 11, air in the top cowling 302 is introduced from the fin cover 210 into the space 222 by the rotation of the fin 146.

As indicated by arrow in FIG. 9 and FIG. 13, the air in the space 222 (FIG. 13) is discharged into the space 313 (FIG. 9) by the fin 146 through the first ventilation duct 225, the gap 229 (FIG. 9), the second ventilation duct 228 (FIG. 9), and the ventilation opening 315 (FIG. 9).

On the other hand, when the engine 5 stops, the fan 226 (FIG. 9) is driven by the control of the ECU 103 (FIG. 7) if the temperature in the second exhaust pipe 72 detected by the first temperature sensor TS1 (FIG. 5) increases to be a certain value or more. In this case, as indicated by arrow in FIG. 9, air around the first exhaust pipe 71 and the second exhaust pipe 72 is discharged into the space 313 through the fan 226, the second ventilation duct 228, and the ventilation opening 315.

The air discharged into the space 313 is discharged to the outside of the top cover 301 from a discharge section disposed in the space 313 or from a gap between the top cover 301 and the top cowling 302.

As described above, ventilation is performed in the top cowling 302. The ECU 103 stops the drive of the fan 226, if the temperature in the second exhaust pipe 72 (FIG. 5) detected by the first temperature sensor TS1 (FIG. 5) falls to be a certain value or less, or if the operation period of the fan 226 reaches a certain duration or more.

As described above, in the present preferred embodiment, the catalyst cover 137 is arranged to cover the first and second exhaust pipes 71, 72 (FIG. 9) on an −Y side. The catalyst cover 137 is arranged to extend to a lower end portion of the outer wall 203 of the flywheel magneto cover 200. In this case, the catalyst cover 137 is preferably used as a guide wall to efficiently flow the air around the first and second exhaust pipes 71, 72 to the fan 226, when the top cowling 302 is ventilated. Accordingly, the air heated by radian heat of the catalyst 11 can be efficiently discharged to the outside of the top cowling 302.

(5) Effects of the Present Preferred Embodiment (5-1) Effects of Flywheel Magneto Cover 200
(a) Effects of Fan 226
As shown in FIG. 9, the electric fan 226 is disposed above the catalyst 11. In this case, heat generated in the catalyst 11 can be efficiently discharged to the outside of the upper casing 1. For example, even if ventilation is not performed by the fin 146 when the engine 5 stops operation, heat generated in the catalyst 11 can be efficiently discharged to the outside of the upper casing 1. Accordingly, a temperature increase in the top cowling 302 can be prevented. As a result, electronic components (rectifier regulator unit 121, etc.) and fuel system components (vapor separator tank 124, etc.) can be protected against defects caused by heat.

(b) Effects of Ventilation Passage
In the present preferred embodiment, when the engine 5 operates, ventilation in the top cowling 302 is performed by the fin 146. And, when the engine 5 stops operation, ventilation in the top cowling 302 is performed by the fan 226.

As shown in FIG. 9, the second ventilation duct 228 and the ventilation opening 315 are used as common ventilation passage regardless of whether ventilation is performed by the fin 146 (FIG. 12) or by the fan 226 (FIG. 13).

In this case, the number of passages used for ventilation can be reduced. Thus, the flywheel magneto cover 200 can be downsized.

(c) Effects of the Elastic Member 213
As shown in FIG. 9, the elastic member 213 can prevent air introduced into the intake opening 314 from flowing in a ±X direction. Accordingly, air introduced into the intake opening 314 can be prevented from immediately flowing from the inflow opening 231 (FIG. 13) into the intake duct 105.

In this case, when water flows into the ventilation opening 315 together with air, the water can be prevented from flowing into the intake duct 105. Accordingly, reliability of the engine 5 can be improved.

(d) Effects of the Shape of the Inflow Opening 231
As shown in FIG. 5, the inflow opening 231 opens downward. Accordingly, water is securely prevented from flowing into the intake duct 105.

(5-2) Effects of Engine 5
(a) Effects Caused by Positional Arrangement of the Catalyst 11 and the First and Second Oxygen Sensors OS1, OS2
As shown in FIG. 9, the first and second exhaust pipes 71, 72 are disposed on one side of the cylinder block 101, and the exhaust passage 70 is disposed on the other side of the cylinder block 101. The third exhaust pipe 73 is disposed to connect the second exhaust pipe 72 and the exhaust passage 70. In the construction described above, the catalyst 11 is disposed to be housed in the first exhaust pipe 71 and the second exhaust pipe 72. The first oxygen sensor OS1 is disposed in the first exhaust pipe 71, and the second oxygen sensor OS2 is disposed in the second exhaust pipe 72.

In the present preferred embodiment, the third exhaust pipe 73 is preferably arranged to pass above the cylinder block 101. That is, the third exhaust pipe 73 is disposed sufficiently above in the upper casing 1.

In this case, in a case where water flows in reverse in the exhaust passage 7 (FIG. 1), the water can be securely prevented from passing in the third exhaust pipe 73 toward an upstream side. Accordingly, the catalyst 11, water adhesion to the first oxygen sensor OS1 and the second oxygen sensor OS2 can be sufficiently prevented. As a result, the catalyst 11, the first oxygen sensor OS1, and the second oxygen sensor OS2 can be improved in reliability.

(b) Effects of Flow Joining-Pipe 134
As shown in FIG. 8, exhaust gas discharged from each cylinder 131 is collected in a lower portion of the upper casing 1 by the flow-joining pipe 134. Accordingly, the first and second exhaust pipes 71, 72 can be disposed on the side of the cylinder block 101. As a result, the catalyst 11 can be disposed on the side of the cylinder block 101, thus an increase in size of the outboard motor 100 can be prevented.

(c) Effects of the Shape of the First Exhaust Pipe 71 and the Second Exhaust Pipe 72

As shown in FIG. 9, a portion of the first exhaust pipe 71 and the second exhaust pipe 72 are disposed to extend vertically on the side of the cylinder 131. Accordingly, a increase in size of the width of the engine 5 can be prevented.

The first and second exhaust pipes 71, 72 and the exhaust passage 70 face each other while interposing a plurality of cylinders 131 in between. In this case, the plurality of cylinders 131 can be disposed in the center of the upper casing 1. Accordingly, stability of the outboard motor improves.

(d) Effects of the Shape of the Exhaust Passage 70

As shown in FIG. 9, the exhaust passage 70 is preferably arranged to extend vertically on the side of the cylinder 131 in the cylinder block 101. Accordingly, an increase in the width of the cylinder block 101 can be prevented.

(e) Effects of Positional Arrangement of the Third Exhaust Pipe 73

As shown in FIG. 9, the third exhaust pipe 73 is preferably arranged to pass above the timing belt 55 and below the flywheel magneto cover 200. In this case, the drive pulley 52, the driven pulleys 53, 54, the timing belt 55, and the third exhaust pipe 73 shown in FIG. 2 and FIG. 3 do not have to be spaced apart. Thus, an increase in size of the engine 5 can be prevented.

As shown in FIG. 13, the third exhaust pipe 73 is arranged to be covered by the flywheel magneto cover 200. In this case, the second exhaust pipe 72 can be cooled by air current produced by the fin 146 (FIG. 11) and the fan 226 (FIG. 9) of the flywheel magneto cover 200. Accordingly, an excessive temperature increase in the catalyst 11 can be prevented.

(f) Effects of Positional Arrangement of the Belt-Tensioning Device 551

As shown in FIG. 9, the third exhaust pipe 73 is preferably arranged to pass above the belt-tensioning device 551. In this case, the third exhaust pipe 73 and the exhaust passage 70 can be connected at the position where width directional expansion of the timing belt 55 is sufficiently squeezed. Accordingly, the exhaust passage 70 can be located in the proximity of the cylinder 131. As a result, downsizing of the width direction of the cylinder block 101 becomes possible.

(g) Effects of Positional Arrangement of the First Exhaust Pipe 71

As shown in FIG. 5 and FIG. 8, the first exhaust pipe 71 is disposed in the way that a bottommost portion of an inner periphery surface of the first exhaust pipe 71 positions lower than the bottommost cylinder 131. In this case, when water is produced in the first exhaust pipe 71 due to condensation or the like, downstream water-flow caused by exhaust gas discharged from each cylinder 131 can be prevented. Accordingly, water adhesion to the catalyst 11 and the oxygen sensor OS1 can be securely prevented.

(6) Other Examples

In the above preferred embodiments, as shown in FIG. 9, the first oxygen sensor OS1 is preferably disposed in the first exhaust pipe 71. However, the positional arrangement of the first oxygen sensor OS1 is not limited to the above example. For example, the first oxygen sensor OS1 can be disposed in the flow-joining portion 95 (FIG. 8) of the flow-joining pipe 134.

The first oxygen sensor OS1 is preferably disposed upstream relative to the catalyst 11 and downstream relative to the branch portion 94 of the flow-joining pipe 134. In this case, an average value of air-fuel ratio of exhaust gas discharged from each cylinder 131 can be detected with high precision.

In the above preferred embodiments, the second oxygen sensor OS2 is disposed in the second exhaust pipe 72. However, the second oxygen sensor OS2 is not necessary to be disposed. In this case, the ECU 103 may determine whether or not exhaust gas is properly purified in the catalyst 11, based on a detected value of the first temperature sensor TS2.

In the above preferred embodiments, the cooling water supply portion 711 and the extension pipe 712 are disposed in a lower end portion of the first exhaust pipe 71. However, the cooling water supply portion 711 and the extension pipe 712 may be disposed in a lower end portion of the flow-joining pipe 134.

In the above preferred embodiments, the communication passage 713 is disposed in a lower end portion of the first exhaust pipe 71. However, the communication passage may be disposed in a lower end portion of the flow-joining portion 95.

The third exhaust pipe 73 does not have to pass above the topmost cylinder 131. It is acceptable as long as a portion of the third exhaust pipe 73 is located above the cylinder 131.

The number of the cylinders 131 does not have to be four, but may be three or lower, or may be five or more.

Two or more of the flow-joining pipe 134, the first exhaust pipe 71, the second exhaust pipe 72, the third exhaust pipe 73, and the exhaust passage 70, may be integrally formed.

In the above preferred embodiments, when temperature in the second exhaust pipe 72 reaches a certain degree or more, the fan 226 is preferably driven by the ECU 103. However, a condition of driving the fan 226 is not limited to the above example. For example, a temperature sensor may be disposed in the engine body 51, and the fan 226 may be driven by the ECU 103 when the temperature detected by the temperature sensor reaches a certain degree or more.

Second Preferred Embodiment

Figure 14:
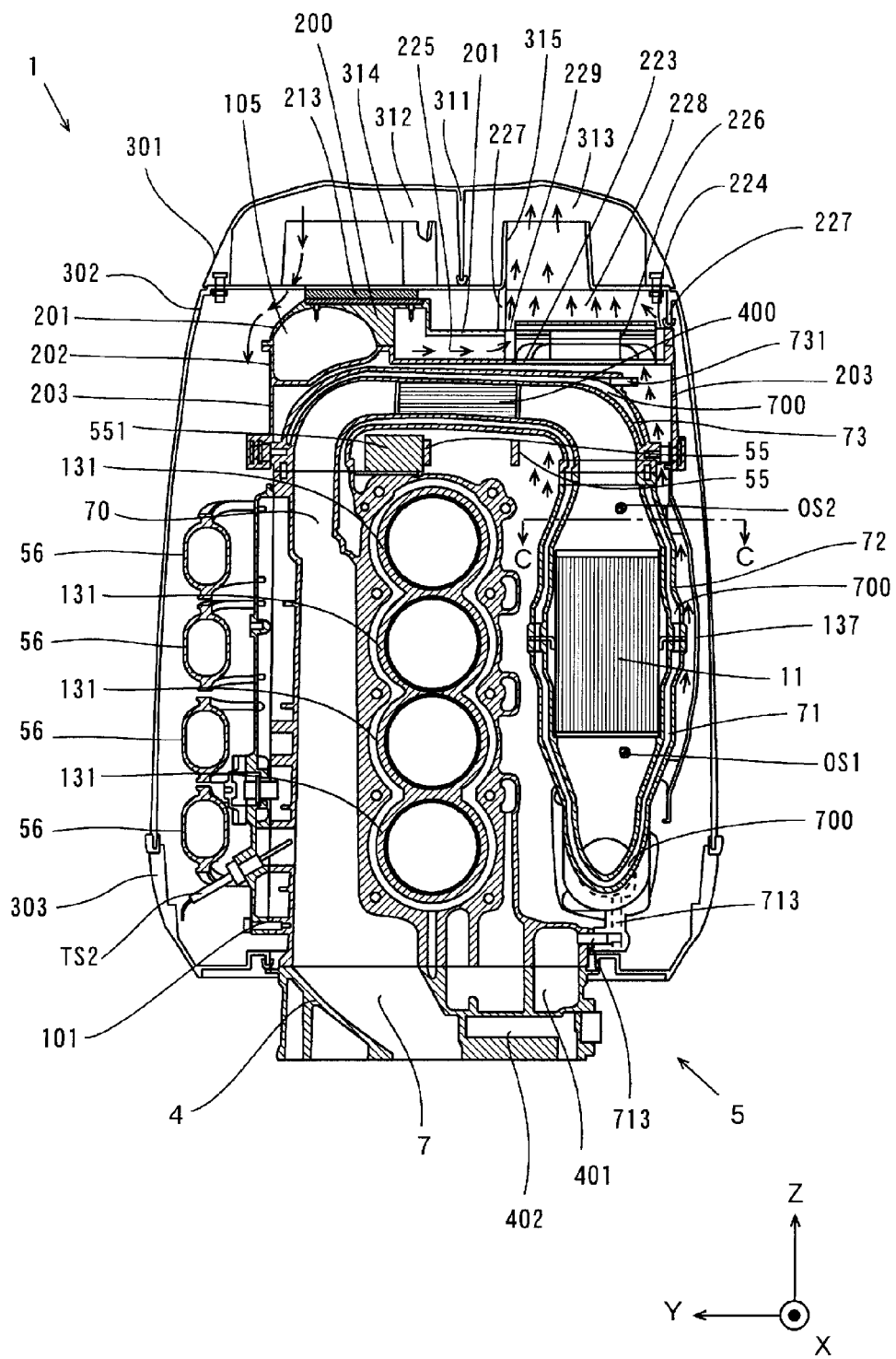
FIG. 14 shows a construction in an upper casing of an outboard motor according to the second preferred embodiment of the present invention.

FIG. 14 shows a construction in the upper casing 1 of the outboard motor according to the second preferred embodiment.

The outboard motor according to the present preferred embodiment differs from the outboard motor 100 according to the first preferred embodiment in the following point.

As shown in FIG. 14, in the present preferred embodiment, a moisture capture member 400 is preferably disposed in the third exhaust pipe 73. The moisture capture member preferably has a honeycomb configuration, for example. The moisture capture member 400 is preferably made of metal or ceramic, for example.

In the present preferred embodiment, since the moisture capture member 400 is disposed in the third exhaust pipe 73, moisture in the third exhaust pipe 73 can be surely removed in the moisture capture member 400. Accordingly, droplets, which are created by water that has flowed into the exhaust passage 70, can be securely prevented from flowing into the second exhaust pipe 72 and the first exhaust pipe 71 through the third exhaust pipe 73. As a result, the catalyst 11, the first oxygen sensor OS1, and the second oxygen sensor OS2 can be sufficiently improved in reliability.

Third Preferred Embodiment

Figure 15:
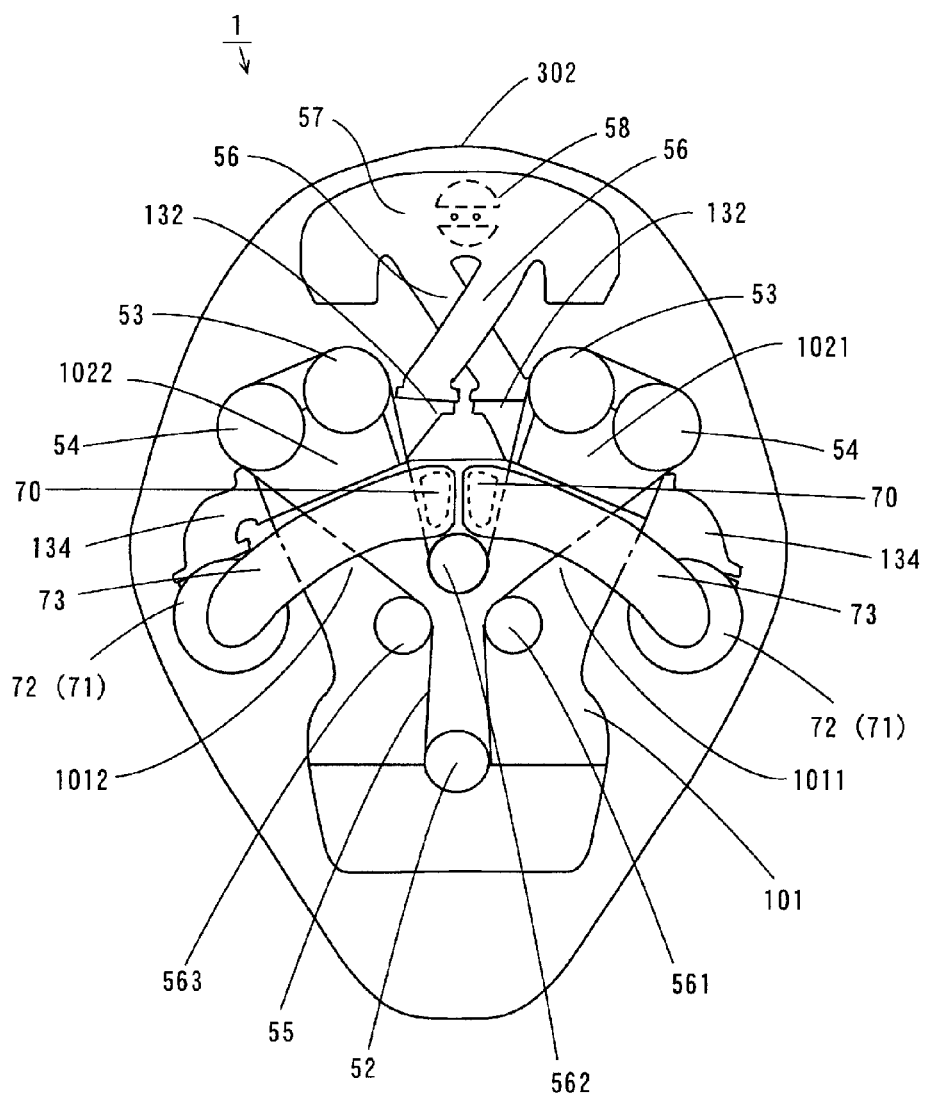
FIG. 15 is a schematic top view of an outboard motor according to the third preferred embodiment of the present invention.

FIG. 15 is a schematic top view of an outboard motor according to the third preferred embodiment.

The outboard motor according to the present preferred embodiment differs from the outboard motor 100 according to the first preferred embodiment in the following point.

As shown in FIG. 15, in the present preferred embodiment, a first branch portion 1011 and a second branch portion 1012 are formed in the shape of V on a −X side of the cylinder block 101. In the first branch portion 1011, a plurality of cylinders (not shown) are disposed to be lined vertically. Similarly, in the second branch portion 1012, a plurality of cylinders (not shown) are disposed to be lined vertically.

A first cylinder head 1021 and a second cylinder head 1022 are disposed on a −X side of the first branch portion 1011 and the second branch portion 1012, respectively. In the same way as in FIG. 2, the driven pulleys 53, 54 are disposed in the first cylinder head 1021 and the second cylinder head 1022, respectively. In the same way as in FIG. 2, the driven pulley 52 is disposed on a +X side of the cylinder block 101. A timing belt 55 is placed on the drive pulley 52 and the driven pulleys 53, 54.

Idler pulleys 561, 562 and the belt-tensioning device 563 are disposed in a center portion of a top surface of the cylinder block 101. An outer periphery surface of the timing belt 55 is abutted on the idler pulley 561 between the drive pulley 52 and the driven pulley 54 on the first cylinder head 1021. An outer periphery surface of the timing belt 55 is abutted on the idler pulley 562 between the driven pulley 53 on the first cylinder head 1021 and the driven pulley 53 on the second cylinder head 1022. An outer periphery surface of the timing belt 55 is abutted on the belt-tensioning device 563 between the driven pulley 54 on the second cylinder head 1022 and the driven pulley 52.

The surge tank 57 is disposed on a −X side of the first and second cylinder heads 1021, 1022. The surge tank 57 is provided with a throttle body 58 and a plurality of intake pipes 56.

In the same way as in FIG. 8, a plurality of intake ports 132 are disposed on a +Y side of the first cylinder head 1021. In the same way as in FIG. 8, a plurality of intake ports 132 are disposed on a −Y side of the second cylinder head 1022. The intake pipes 56 are connected to the intake ports 132 respectively between the first cylinder head 1021 and the second cylinder head 1022.

The flow-joining pipe 134 similar to that of FIG. 8 is disposed on a side surface of the first cylinder head 1021 on a −Y side and on a side surface of the second cylinder head 1022 on a +Y side.

The flow-joining pipe 134 is connected with the first and second exhaust pipes 71, 72 respectively in the same way as in FIG. 9. In the same way as in FIG. 9, the catalyst 11 (not shown) is disposed in the first and second exhaust pipes 71, 72.

Two exhaust passages 70 are formed in the cylinder block 101 between the first cylinder head 1021 and the second cylinder head 1022 in the same way as in FIG. 9.

In the same way as in FIG. 9, the third exhaust pipe 73 is disposed to communicate the exhaust passage 70 and the second exhaust pipe 72 respectively. In the present preferred embodiment, the third exhaust pipe 73 on the first cylinder head 1021 side is preferably arranged to pass above the first branch portion 1011 and the timing belt 55, and the third exhaust pipe 73 on the second cylinder head 1022 side is preferably arranged to pass above the second branch portion 1012 and the timing belt 55.

Fourth Preferred Embodiment

Figure 16:
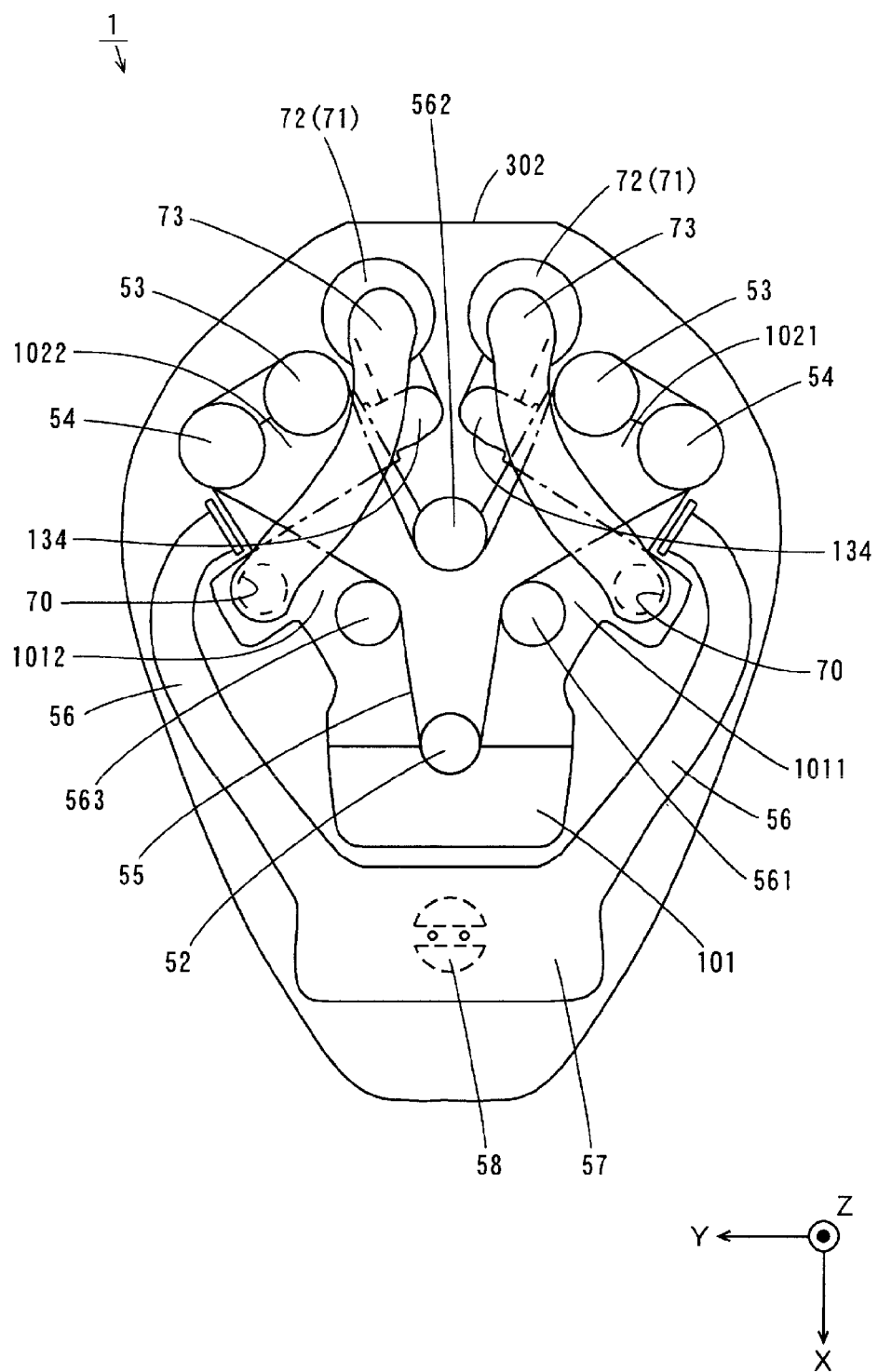
FIG. 16 is a schematic top view of an outboard motor according to the fourth preferred embodiment of the present invention.

FIG. 16 is a schematic top view of an outboard motor according to the fourth preferred embodiment.

The outboard motor according to the present preferred embodiment differs from the outboard motor according to the third preferred embodiment in the following point.

As shown in FIG. 16, in the present preferred embodiment, the surge tank 57 is disposed on a +X side of the cylinder block 101. The plurality of intake pipes 56 are disposed on a −Y side of the cylinder block 101 to connect the surge tank 57 and a side surface of the first cylinder head 1021 on a −Y side. The plurality of intake pipes 56 are disposed on a +Y side of the cylinder block 101 to connect the surge tank 57 and a side surface of the second cylinder head 1022 on a +Y side.

The flow-joining pipe 134 similar to that of FIG. 8 is disposed on a side surface of the first cylinder head 1021 on a +Y side and on a side surface of the second cylinder head 1022 on a −Y side. On a −X side of the cylinder block 101, the first and second exhaust pipes 71, 72 are connected to the respective flow-joining pipes 134. The catalyst 11 (not shown) is disposed in the first and second exhaust pipes 71, 72.

The exhaust passage 70 similar to that of FIG. 9 is formed in the first branch portion 1011 on a −Y side and in the second branch portion 1012 on a +Y side. The third exhaust pipe 73 is arranged to communicate the exhaust passage 70 and the second exhaust pipe 72. In the present preferred embodiment, the third exhaust pipe 73 on the first branch portion 1011 side is preferably arranged to pass above the first branch portion 1011 and the timing belt 55, and the third exhaust pipe 73 on the second branch portion 1012 side is disposed to pass above the second branch portion 1012 and the timing belt 55.

Control System

According to the control system described below, specific problems happening in general outboard motors can be solved. First, specific problems happening in general outboard motors are described.

(1) Problems

In a case where a throttle valve of outboard motor engine is reduced quickly when a boat is traveling at high speed, a hull has a large braking force applied thereto and the boat speed is reduced suddenly. Accordingly, water in the vicinity of a rear portion of the hull flows to pass in a forward direction (hereinafter, referred to as the following wave effect).

If a position of a gear (hereinafter, referred to as a shift gear), which changes forward travel and backward travel in a state where the hull speed is lowered due to the above-described braking force, is changed from a forward traveling position to a backward traveling position, a propeller of the outboard motor rotates to push water from the rear to the front.

Under such a state, water, which is pushed to the front by the following wave effect and the propeller, may intrude into an exhaust passage from an outlet of exhaust gas. However, in a state where the engine operates, according to exhaust pressure from the engine, water intruded from the outlet is prevented from reaching a top portion of the outboard motor.

On the other hand, when the hull is suddenly reduced in speed, water flows from the front to the rear with respect to the propeller since the hull travels forward through inertia. This water-flow applies torque to the propeller. If the shift gear is set in a forward traveling position in such a state, engine speed is determined by the torque applied from the engine to the crankshaft and by the torque applied from water-flow to the propeller.

In a case where the throttle valve is fully closed when the hull is traveling through inertia, the torque applied from water-flow to the propeller becomes larger than the torque applied from the engine to the crankshaft. When the shift gear is changed to a backward position in such state, the propeller is applied with the torque, which is in an opposite direction of the torque applied from the engine to the crankshaft, and which is larger than the torque applied from the engine to the crankshaft. Accordingly, the engine is caused to miss and stop.

In this case, the crankshaft rotates in reverse by the torque provided by the propeller, and exhaust gas in the exhaust passage flows backward. Accordingly, water intruded from the outlet into the exhaust passage may be sucked further.

(2) Control System

Figure 17:
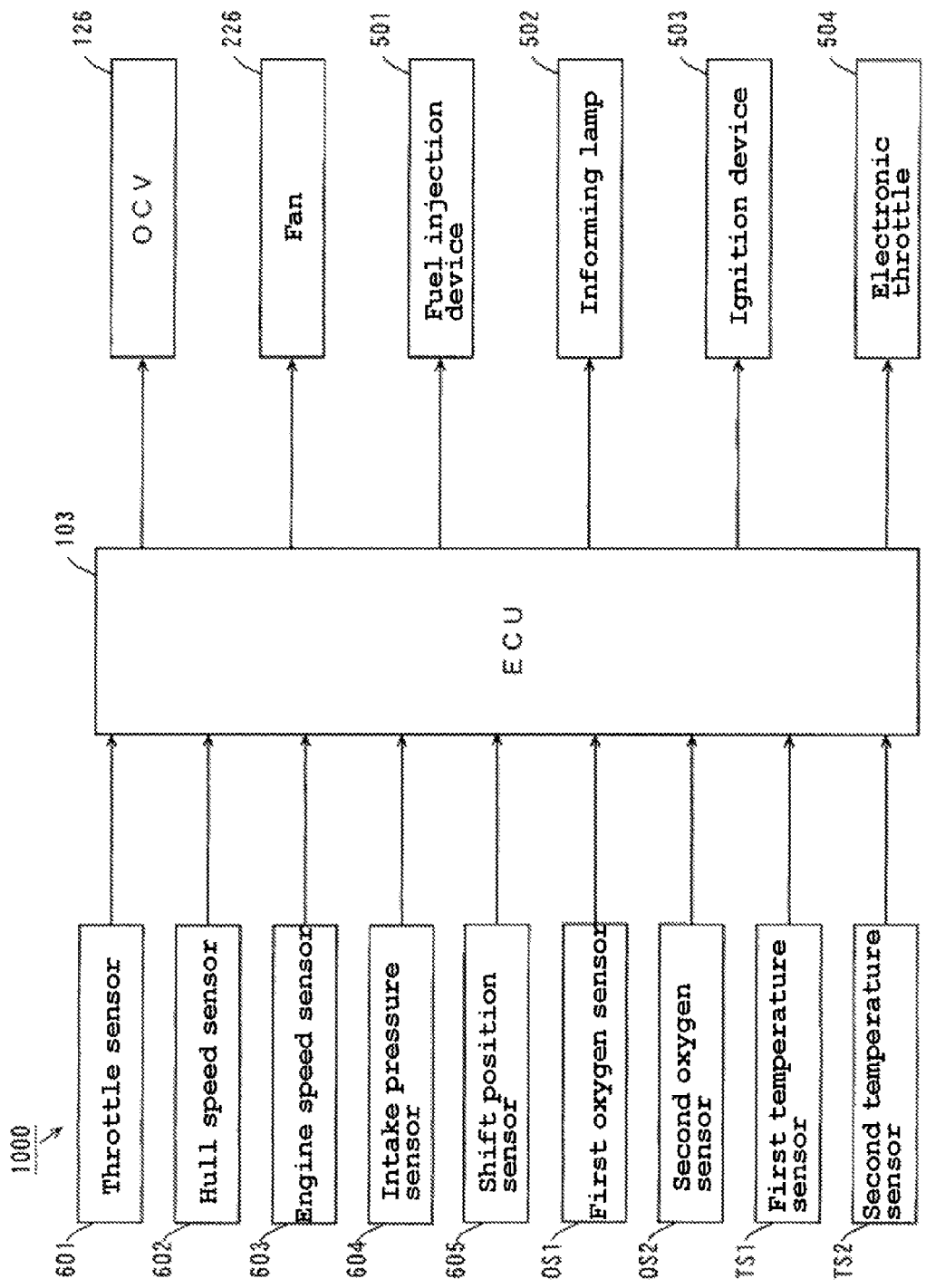
FIG. 17 is a block diagram showing an example of a control system of an outboard motor.

FIG. 17 is a block diagram showing an example of a control system of the outboard motor 100.

As shown in FIG. 17, a control system 1000 preferably includes the ECU 103, a throttle sensor 601, a hull speed sensor 602, an engine speed sensor 603, an intake pressure sensor 604, a shift position sensor 605, the first oxygen sensor OS1, the second oxygen sensor OS2, the first temperature sensor TS1, the second temperature sensor TS2, the oil control valve (OCV) 126, the fan 226, a fuel injection device 501, an informing lamp 502, an ignition device 503, and an electronic throttle 504.

The throttle sensor 601 is disposed in the throttle drive motor 59 (FIG. 4) and detects a throttle opening of the electronic throttle 504. The hull speed sensor 602 has a GPS function for example, and detects the speed of the hull 901 (FIG. 1). The engine speed sensor 603 detects the rotational speed of the engine 5 (FIG. 1) by detecting a rotational angle of the crankshaft 142 (FIG. 11), for example. The intake pressure sensor 604 is disposed in the intake pipe 56 (FIG. 8) or the intake port 132 (FIG. 8), for example, and detects the pressure in the intake pipe 56 or the intake port 132. The shift position sensor 605 is disposed in a shift slider 109 for example, and detects a shift position (forward, neutral, or backward) of the shift gear.

The fuel injection device 501 is disposed in the intake port 132 for example, and injects fuel into the intake port 132. The informing lamp 502 is disposed in a position where it can be visually recognized by an operator of the hull 901 (FIG. 1), and lit under a certain condition as described later. The ignition device 503 is disposed in the cylinder head 102 (FIG. 4), and performs spark-ignition of fuel-air mixture in the engine 5 (FIG. 1). The electronic throttle 504 is disposed in the intake port 132 (FIG. 8), and adjusts an amount of air introduced to the engine 5 by control of the ECU 103.

In the construction described above, if a unit-time-change-amount of a detected value of the second temperature sensor TS2 exceeds a certain threshold value (if temperature is lowered suddenly), the ECU 103 executes a water intrusion suppression control described below.

In water intrusion suppression control, when the throttle opening is a certain threshold value or lower, and when the speed of the hull 901 is a certain threshold value or more, and when a shift position is in a forward position, the ECU 103 sets a shortest overlap period of an intake valve (not shown) and an exhaust valve (not shown) by increasing the throttle opening of the electronic throttle 504 to a certain target value and by adjusting an oil amount of the OCV 126.

Accordingly, torque generated in the engine 5 can be increased. At the same time, an amount of burned gas (EGR gas) that flows backward into the engine 5 can be reduced by shortening an overlap period. As a result, when problems as described above occur, engine misfire can be prevented. Accordingly, backflow of water to an upper portion of the outboard motor 5 can be prevented.

The certain target value of throttle opening described above is set larger than the certain threshold value of throttle opening described above. A certain target value of throttle opening is a variable set in accordance with a load of the engine 5 calculated based on the hull speed and a detected value of the intake pressure sensor 604.

In addition to the control described above, the ECU 103 may control the ignition device 503 to advance an ignition timing of fuel-air mixture in the engine 5 to the proximity of knocking limitation.

A certain target value of throttle opening may be calculated by the ECU 103 in accordance with hull speed, so that the engine speed can be lowered as much as possible while avoiding misfire.

In the present preferred embodiment, the ECU 103 sets an appropriate target value of throttle opening, and adjusts a fuel injection amount injected by the fuel injection device 501, and adjusts an air-fuel ratio to an appropriate value, in accordance with hull speed.

The ECU 103 determines whether or not exhaust gas is properly purified in the catalyst 11 (FIG. 9), based on a detected value of the second oxygen sensor OS2 and a detected value of the first temperature sensor TS1. When the exhaust gas is determined to be not properly purified in the catalyst 11, the ECU 103 lights the informing lamp 502. Accordingly, an operator can recognize a state of the catalyst 11.

The ECU 103 controls the fan 226 based on a detected value of the engine speed sensor 603. In detail, the ECU 103 actuates the fan 226 when the engine 5 stops. Accordingly, a temperature increase in the top cowling 302 (FIG. 9) can be prevented even when the engine 5 stops.

The ECU 103 may control the fan 226 based on a detected value of the first temperature sensor TS1. Accordingly, a temperature increase in the top cowling 302 (FIG. 9) can be securely prevented.

The present invention can be effectively utilized in an outboard motor mounted in a boat.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An outboard motor comprising:
a cowling;
an engine disposed in the cowling;
a discharge section arranged below the cowling and to discharge burned gas generated in the engine;
an exhaust passage arranged to guide burned gas from the engine to the discharge section;
a catalyst arranged to purify the burned gas in the exhaust passage;
an electric fan arranged directly above the catalyst and to discharge air in the cowling to an outside of the cowling;
a fin arranged in an upper portion of the engine and rotated by a crankshaft of the engine; and
a first cover member arranged to cover an upper portion of the engine, the first cover member including a first opening located on an upper surface side of the first cover member; wherein
the cowling includes a ceiling surface disposed above the first cover member, and a ventilation opening, in communication with the fan, the fin, and the first opening, is located in the ceiling surface.

2. The outboard motor according to claim 1, wherein the catalyst is located on a side of the engine.

3. The outboard motor according to claim 1, wherein the fan is arranged to be operated when the engine is not driven.

4. The outboard motor according to claim 1, further comprising a temperature sensor disposed in the engine or the exhaust passage, and a controller arranged to operate the fan when a temperature detected by the temperature sensor reaches a certain degree or higher.

5. The outboard motor according to claim 1, further comprising a second opening located on a lower surface side of the first cover member, a third opening located on an upper surface side of the first cover member, a first communication passage arranged to connect the first opening and the second opening, and a second communication passage arranged to connect the first opening and the third opening, wherein the fan is disposed in the first communication passage, and the fin is disposed in the second communication passage.

6. The outboard motor according to claim 5, wherein the second opening is disposed directly above the catalyst.

7. The outboard motor according to claim 5, wherein the cowling includes a fourth opening that is disposed in the ceiling surface and connects an inside of the cowling and an outside of the cowling, and the first cover member includes an intake passage arranged to introduce air in the cowling to the engine, a fifth opening arranged to connect the intake passage and inside of the cowling, and a divider disposed between the fourth opening and the fifth opening.

8. The outboard motor according to claim 1, further comprising a second cover member arranged to cover a side of the catalyst.

9. The outboard motor according to claim 1, further comprising a top cover arranged above the ceiling surface of the cowling, wherein the ventilation opening is in communication with a space provided between the top cover and the ceiling surface of the cowling, and the air is discharged from the space via a gap between the top cover and the cowling.

10. The outboard motor according to claim 1, further comprising an intake space arranged to introduce air in the cowling to the engine, and a partitioning wall arranged between the intake space and a space to which the ventilation opening discharges the air.

* * * * *